US012434876B2

(12) United States Patent
Iijima

(10) Patent No.: US 12,434,876 B2
(45) Date of Patent: Oct. 7, 2025

(54) LABELING APPARATUS AND DISCHARGE PORTION AND GRIPPING PORTION THEREOF

(71) Applicant: BROTHER KOGYO KABUSHIKI KAISHA, Nagoya (JP)

(72) Inventor: Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 149 days.

(21) Appl. No.: 18/458,153

(22) Filed: Aug. 30, 2023

(65) Prior Publication Data

US 2024/0067383 A1 Feb. 29, 2024

(30) Foreign Application Priority Data

Aug. 30, 2022 (JP) ................................ 2022-136907

(51) Int. Cl.
*B32B 41/00* (2006.01)
*B65C 11/02* (2006.01)
*B65C 9/40* (2006.01)

(52) U.S. Cl.
CPC ...... *B65C 11/0257* (2013.01); *B65C 11/0289* (2013.01); *B65C 2009/402* (2013.01)

(58) Field of Classification Search
CPC ............. B65C 11/0257; B65C 11/0289; B65C 2009/402; B65C 2210/0064; B65C 2210/0075; B65C 2210/0078; B65C 2210/0086; B65C 11/0226; B65C 2210/0043; B65C 2210/0094
USPC .................... 156/60, 64, 350, 351, 378, 379
See application file for complete search history.

(56) References Cited

U.S. PATENT DOCUMENTS 4,830,522 A 5/1989 Sato et al.
2012/0069118 A1* 3/2012 Mistyurik .................. B41J 3/36 347/109

FOREIGN PATENT DOCUMENTS

JP H06-40447 A 2/1994

* cited by examiner

*Primary Examiner* — Michael N Orlando
*Assistant Examiner* — Joshel Rivera
(74) *Attorney, Agent, or Firm* — KENEALY VAIDYA LLP

(57) ABSTRACT

A labeling apparatus includes: a housing; a printing portion provided in the housing and configured to print on a plurality of labels of a label sheet being provided with an adhesive layer; a peeling portion provided in the housing and configured to peel the label printed by the printing portion from the elongated mount; a discharge portion provided in the housing and having a discharge port for discharging the label peeled by the peeling portion, the discharge port being arranged at an end portion that is away from the housing; and a gripping portion provided on a side of the housing different from the discharge portion and configured to allow a user to grip with one hand, wherein the discharge portion includes a holder configured to hold the label peeled by the peeling portion before the label is discharged from the discharge port.

16 Claims, 15 Drawing Sheets

LABELING APPARATUS AND DISCHARGE PORTION AND GRIPPING PORTION THEREOF

REFERENCE TO RELATED APPLICATIONS

This application claims priority from Japanese Patent Application No. 2022-136907 filed on Aug. 30, 2022. The entire content of the priority application is incorporated herein by reference.

BACKGROUND ART

The present disclosure relates to a labeling apparatus and a discharge portion and a gripping portion thereof.

An electronic hand labeler is known in which a user grips and operates a grip and sticks a label printed by a thermal head to a sticking target surface. For example, in the related-art electronic hand labeler, i.e., one example of a labeling apparatus, the label printed by the thermal head is peeled from a mount by a turning pin, is discharged from a label issuing port while being placed on an auxiliary peeling pin, and is fed below a sticking roller. The user holds the grip to place the label on the sticking target surface, pulls the hand labeler toward the user, and presses the label against the sticking target surface with the sticking roller, thereby sticking the label to the sticking target surface.

DESCRIPTION

In a case where a label longer than the related art is stuck to the sticking target surface, when the label is placed on the auxiliary peeling pin in a state of being peeled, a leading end side (downstream side in a conveyance direction) of the label is suspended downward, and it is difficult to stick the label. In addition, in the related-art electronic hand labeler, since a discharge direction of the label is different from a direction in which the label is peeled from the mount, it is difficult to pull out the label at the time of sticking when the label is placed on the auxiliary peeling pin in a state where a part of the label is not peeled.

The present disclosure is to provide a labeling apparatus capable of holding a label before sticking in a state of being peeled from a mount and accurately sticking the label to a sticking target surface, and a discharge portion and a gripping portion thereof.

According to a first aspect of the present disclosure, there is provided a labeling apparatus including: a housing; a printing portion provided in the housing and configured to print on a plurality of labels of a label sheet being provided with an adhesive layer; a peeling portion provided in the housing and configured to peel the label printed by the printing portion from the elongated mount; a discharge portion provided in the housing and having a discharge port for discharging the label peeled by the peeling portion, the discharge port being arranged at an end portion that is away from the housing; and a gripping portion provided on a side of the housing different from the discharge portion and configured to allow a user to grip with one hand, wherein the discharge portion includes a holder configured to hold the label peeled by the peeling portion before the label is discharged from the discharge port.

The holder can hold the label before being stuck to the sticking target surface in a state of being peeled from the mount before the label is discharged from the discharge port. After positioning and sticking an end portion on a downstream side of the label in a discharge direction to the sticking target surface, the user can easily discharge the label from the discharge portion and stick the label to the sticking target surface simply by moving the housing. Since a force applied when the label is peeled from the mount does not act on the label in the sticking of the label, the user can accurately stick the label to the sticking target surface.

The holder of the first aspect may hold the label peeled by the peeling portion in a state in which the end portion on the downstream side of the label in the discharge direction, which is a direction in which the label is conveyed in the discharge portion, protrudes downstream of the discharge port. By causing the end portion on the downstream side of the label in the discharge direction to protrude from the discharge port, the user can easily position the end portion of the label on the sticking target surface while viewing a position of the end portion of the label, and thus the user can accurately stick the label on the sticking target surface.

The holder of the first aspect may include a rotation body that is brought into contact with an adhesive surface on which the adhesive layer of the label is formed. The rotation body is in contact with the adhesive layer of the label, supports the label in the holder, and can feed the label in the discharge direction by rotation. The rotation body is only in contact with the adhesive layer, and it is difficult to apply a load to movement of the label by feeding the label in the discharge direction while rotating. Therefore, the user can accurately stick the label to the sticking target surface.

A plurality of rotation bodies of the first aspect are provided, and the plurality of rotation bodies are disposed side by side along the discharge direction. Since the plurality of rotation bodies are disposed side by side along the discharge direction, the label is less likely to be conveyed while being inclined at the time of sticking. Therefore, the user can accurately stick the label to the sticking target surface.

The rotation body of the first aspect may hold a plurality of spurs in each of which tooth tips protruding in a needle shape are radially formed along an outer periphery of a shaft body extending in a width direction orthogonal to the discharge direction. Since the rotation body holds the plurality of spurs in the same shaft, the label is less likely to be conveyed while being inclined at the time of sticking. Therefore, the user can accurately stick the label to the sticking target surface.

The spur of the first aspect may be fixed to the shaft body. Since the spur is fixed to the shaft body and does not idle, the rotation body can prevent the label from being wound around the rotation body. Further, since rotation amounts of the plurality of spurs are aligned, the rotation body can convey the label straight in the discharge direction, and it is possible to more reliably prevent the label from being obliquely inclined at the time of sticking.

The discharge portion of the first aspect may have a main body portion disposed on a sticking target surface side with respect to a conveyance path of the label along the discharge direction when the label is stuck and holding the rotation body, and a cover portion disposed on a side opposite to the sticking target surface and covering the conveyance path by being assembled to the main body portion, and the cover portion may have a window portion through which the label held by the holder is visible. The user can stick the label to the sticking target surface while confirming a size and an orientation of the label by visually observing the label held by the holder through the window portion. Therefore, the user can accurately stick the label to the sticking target surface.

The cover portion of the first aspect may be detachably attached to the main body portion. When jamming occurs in the holder, the user can easily perform jam processing by detaching the cover portion from the main body portion. In addition, the user can easily perform maintenance of the rotation body. Therefore, the user can maintain a state in which the holder is normally operated, and thus the user can accurately stick the label to the sticking target surface at the time of sticking.

The peeling portion of the first aspect includes a peeling body peeling the label from the mount and a pulling portion disposed downstream of the peeling body in the conveyance path and pulling the mount from which the label is peeled off, and the label peeled from the mount in the peeling body may be fed to the discharge portion by a pulling force by which the pulling portion pulls the mount. Therefore, the labeling apparatus does not require power for conveying the label peeled from the mount to the discharge portion and can reduce the number of components and the production cost.

The discharge direction of the discharge portion of the first aspect may be the same as a peeling direction which is a direction in which the label sheet is conveyed immediately before the label is peeled from the mount in the peeling portion. When being peeled from the label sheet, the label is pushed out in the peeling direction of the label sheet. In the discharge portion, the label is conveyed in the discharge direction, which is the same as the peeling direction, and is held by the holder. That is, the label is conveyed in the same direction from peeling to holding. Therefore, a load is less likely to be applied to the label during conveyance of the label, and oblique feeding and the like during the conveyance can be prevented.

The discharge portion of the first aspect may include an intake port taking in the label peeled by the peeling portion and guiding the label to the holder, a guide path guiding the mount peeled by the peeling portion to the outside of the housing, and a cutting portion provided in the guide path and cutting the mount. The labeling apparatus can cut the peeled mount by the cutting portion. The cutting portion can be disposed at a position closer to the peeling portion by providing the cutting portion in the discharge portion, and thus the sticking of the label can be prevented from being hindered by an uncut mount.

The labeling apparatus of the first aspect may include a driver driving the rotation body of the holder, and a detector provided on a downstream side in the peeling direction with respect to the peeling body of the peeling portion and detecting an end portion on an upstream side of the label which is peeled from the mount in the peeling direction. When a length of the label in the discharge direction is shorter than a length of the holder, the end portion on the downstream side of the label in the discharge direction cannot be protruded from the discharge port only by the pulling force when peeling the label from the label sheet. By detecting a position of the end portion on the upstream side of the label in the peeling direction by the detector and driving the rotation body of the holder according to a detection result, even an end portion on the downstream side of a short label in the discharge direction can be reliably protruded from the discharge port. Therefore, the labeling apparatus can be used even for labels having different lengths in the discharge direction.

The housing of the first aspect may include a housing discharge port disposed to face the intake port of the discharge portion and discharging the label peeled by the peeling portion from the housing, and the discharge portion may be detachably attached to the housing. The discharge portion is attachable and detachable to the housing. Therefore, the user can easily perform maintenance of the housing and the discharge portion by removing the discharge portion.

The gripping portion of the first aspect may be detachably attached to the housing. The gripping portion is attachable and detachable to the housing. Therefore, the user can easily perform maintenance of the housing and the gripping portion by removing the gripping portion.

A second aspect of the present disclosure provides a discharge portion of a labeling apparatus. The labeling apparatus includes a housing, a printing portion printing on a plurality of labels of a label sheet in which the plurality of labels are stuck on an elongated mount, the label being provided with an adhesive layer, a peeling portion peeling the label printed by the printing portion from the mount, a housing discharge port discharging the label peeled by the peeling portion from the housing, and a gripping portion provided on a side different from the housing discharge port in the housing and capable of gripping the housing with one hand. The discharge portion is provided on a side different from the gripping portion in the housing of the labeling apparatus. The discharge portion includes an intake port taking in the label discharged from the housing discharge port, a discharge port provided at an end portion on a side away from the housing and discharging the label taken in from the intake port, and a holder holding the label before the label is discharged from the discharge port. The discharge portion is detachably attached to the housing. Therefore, the second aspect has the same effect as the first aspect.

A third aspect of the present disclosure provides a gripping portion of a labeling apparatus. The labeling apparatus includes a housing, a printing portion printing on a plurality of labels of a label sheet in which the plurality of labels are stuck on an elongated mount, the label being provided with an adhesive layer, a peeling portion peeling the label printed by the printing portion from the mount, and a discharge portion having a discharge port for discharging the label peeled by the peeling portion at an end portion away from the housing. The gripping portion is provided on a side different from the discharge port in the housing of the labeling apparatus and capable of gripping the housing with one hand. The discharge portion includes a holder holding the label before the label is discharged from the discharge port. The gripping portion is detachably attached to the housing. Therefore, the third aspect has the same effect as the first aspect.

Figure 5:
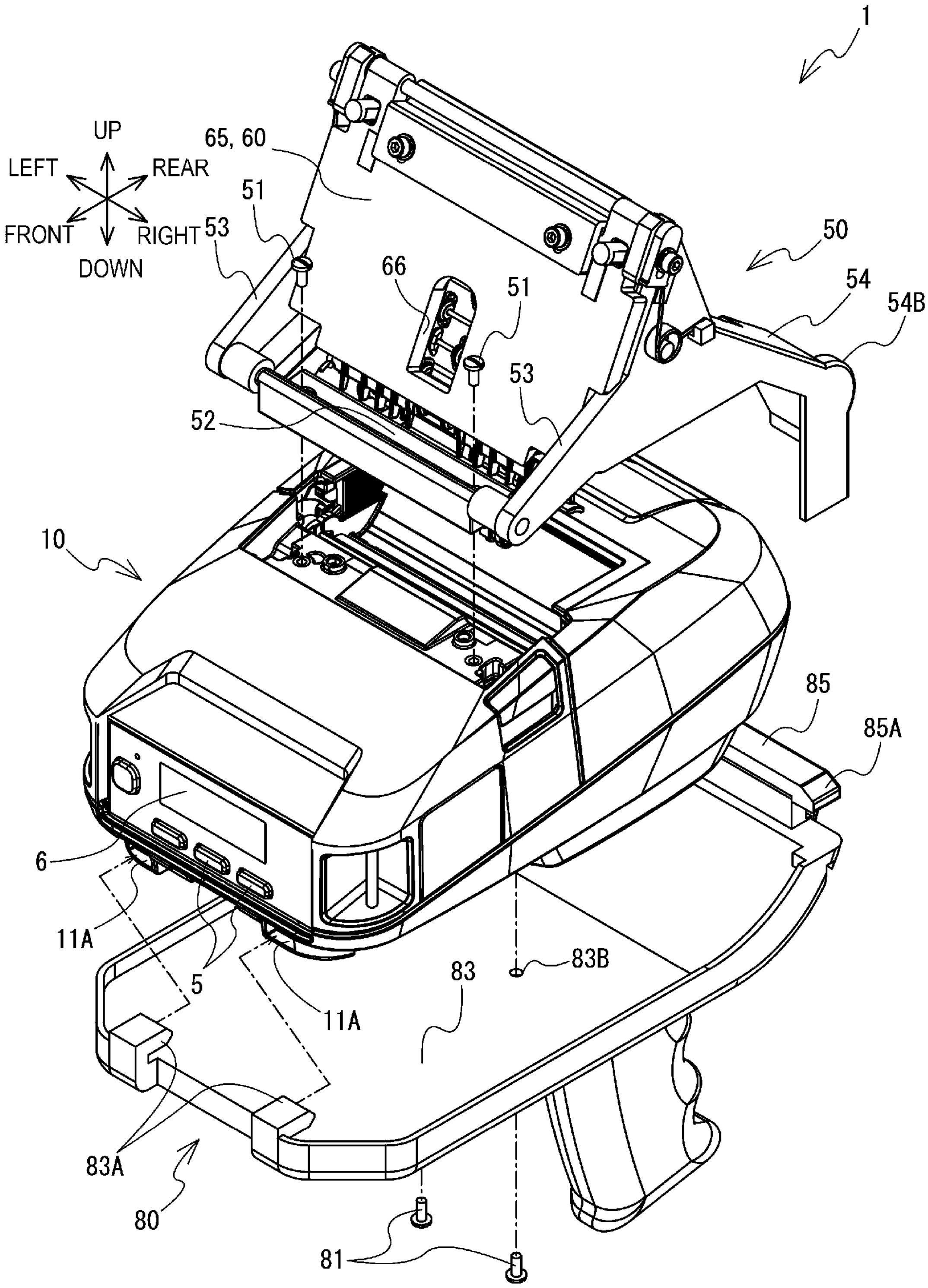

FIG. 5 is a front perspective view of the labeling apparatus 1 in which a discharge portion 50 and a gripping portion 80 are detached.

Figure 6:
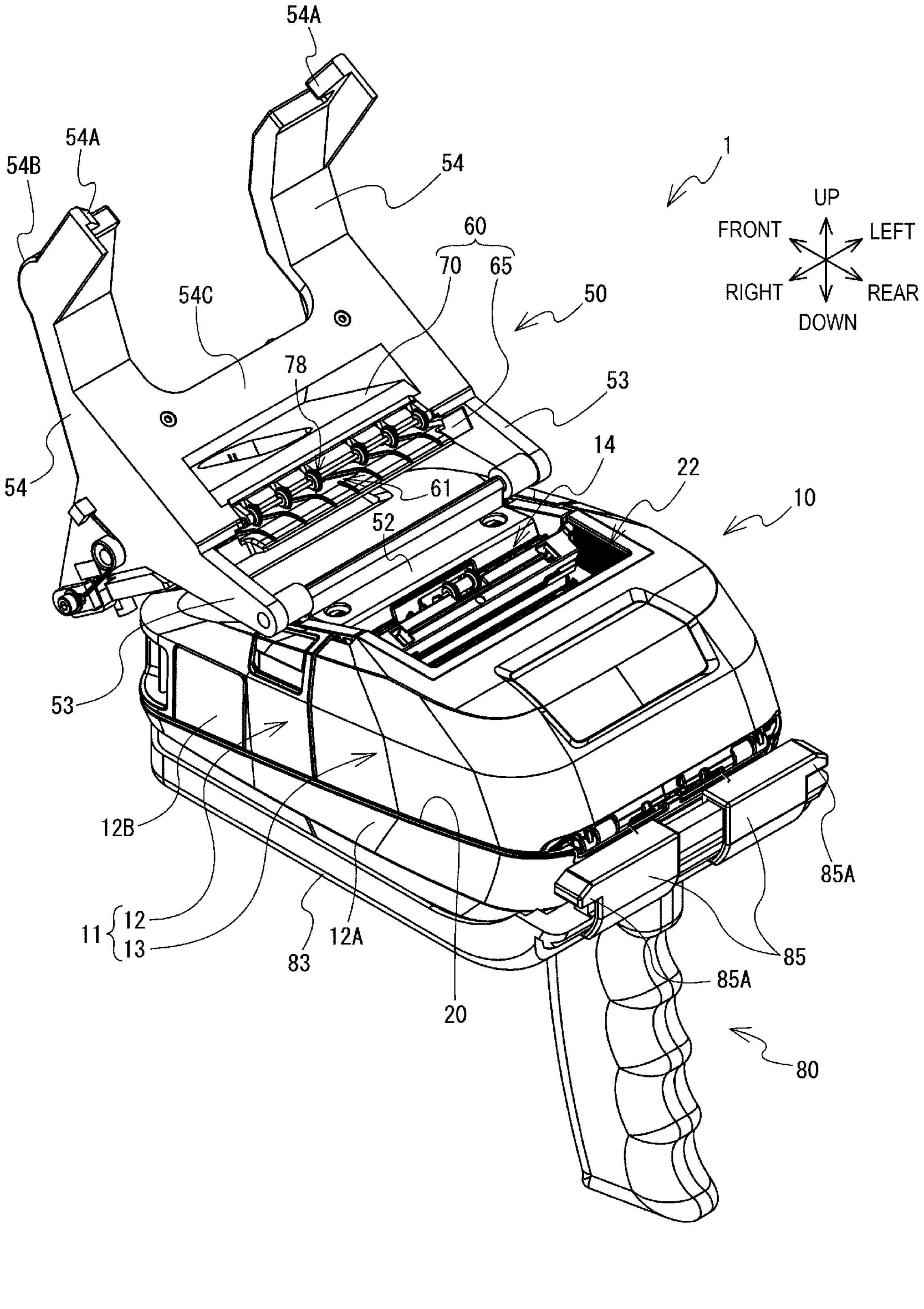

FIG. 6 is a rear perspective view of the labeling apparatus 1 in which the discharge portion 50 is moved to a separation position.

Figure 7:
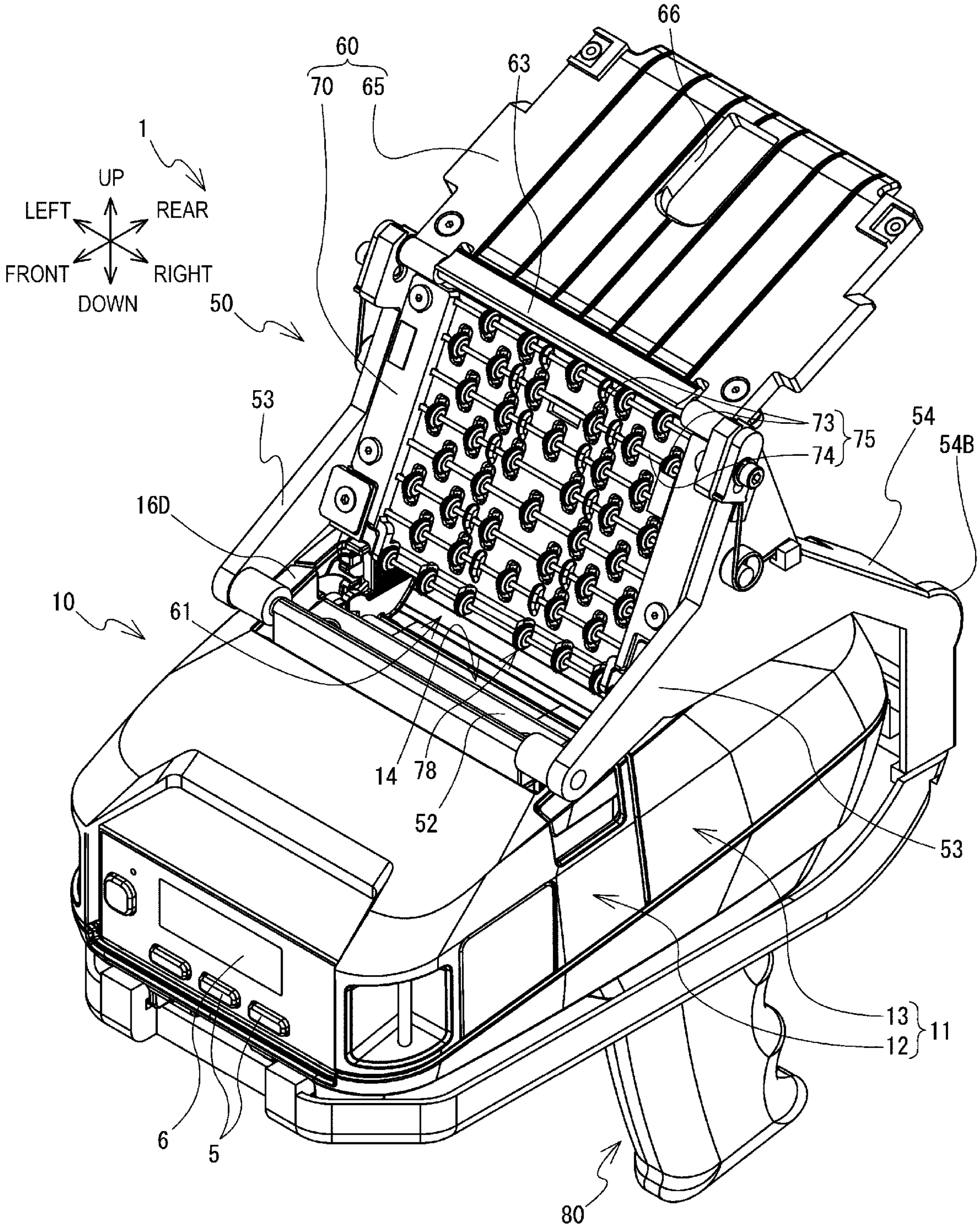

FIG. 7 is a front perspective view of the labeling apparatus 1 in which a cover portion 65 of the discharge portion 50 is opened.

Figure 3:
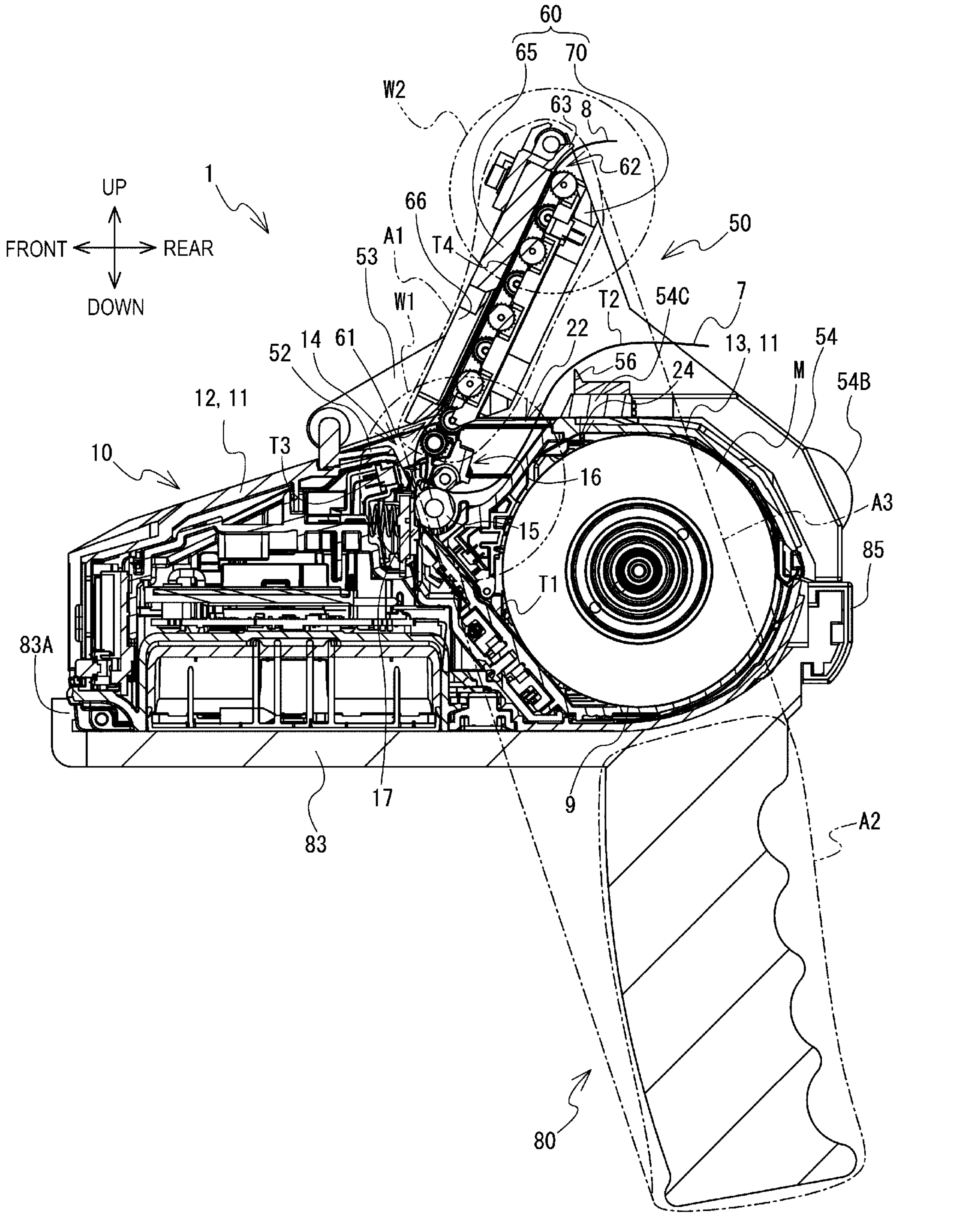
FIG. 3 is a cross-sectional view of the labeling apparatus 1 taken along line I-I in FIG. 1 and viewed in a direction of arrows.
Figure 8:
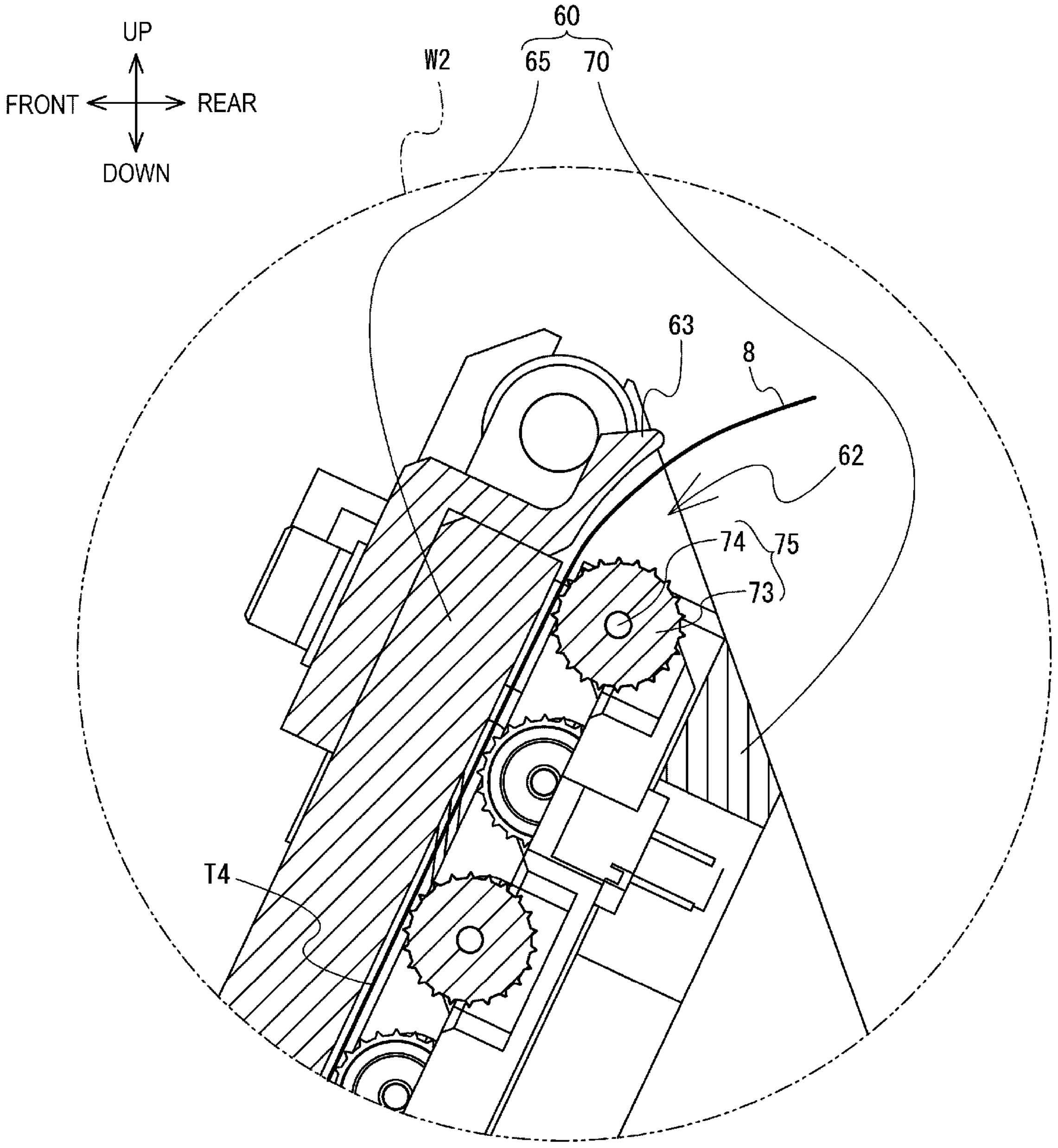

FIG. 8 is a cross-sectional view of the labeling apparatus 1 in which the inside of a two-dot chain line W2 in FIG. 3 is enlarged.

Figure 9:
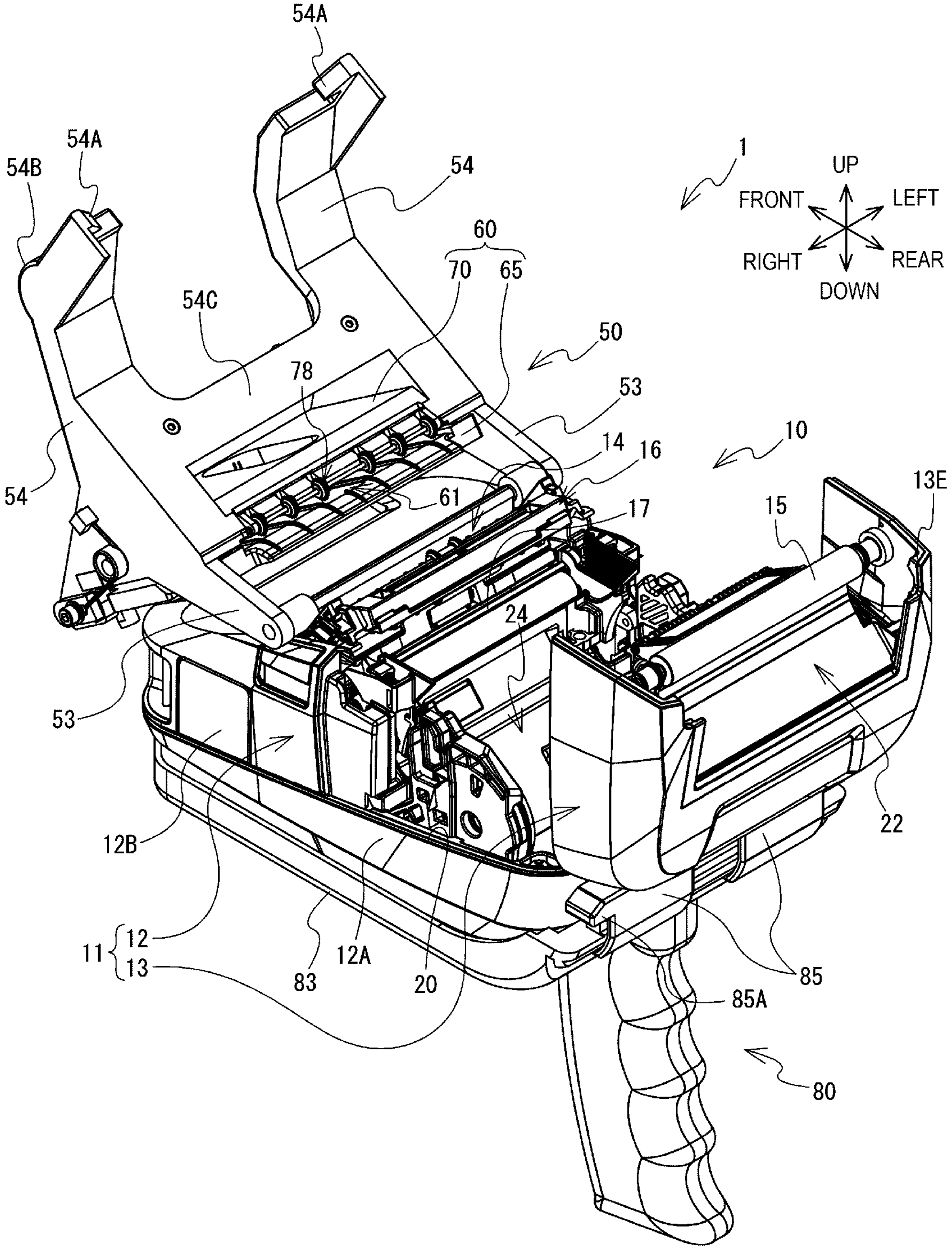

FIG. 9 is a rear perspective view of the labeling apparatus 1 in which a cover 13 is opened.

Figure 10:
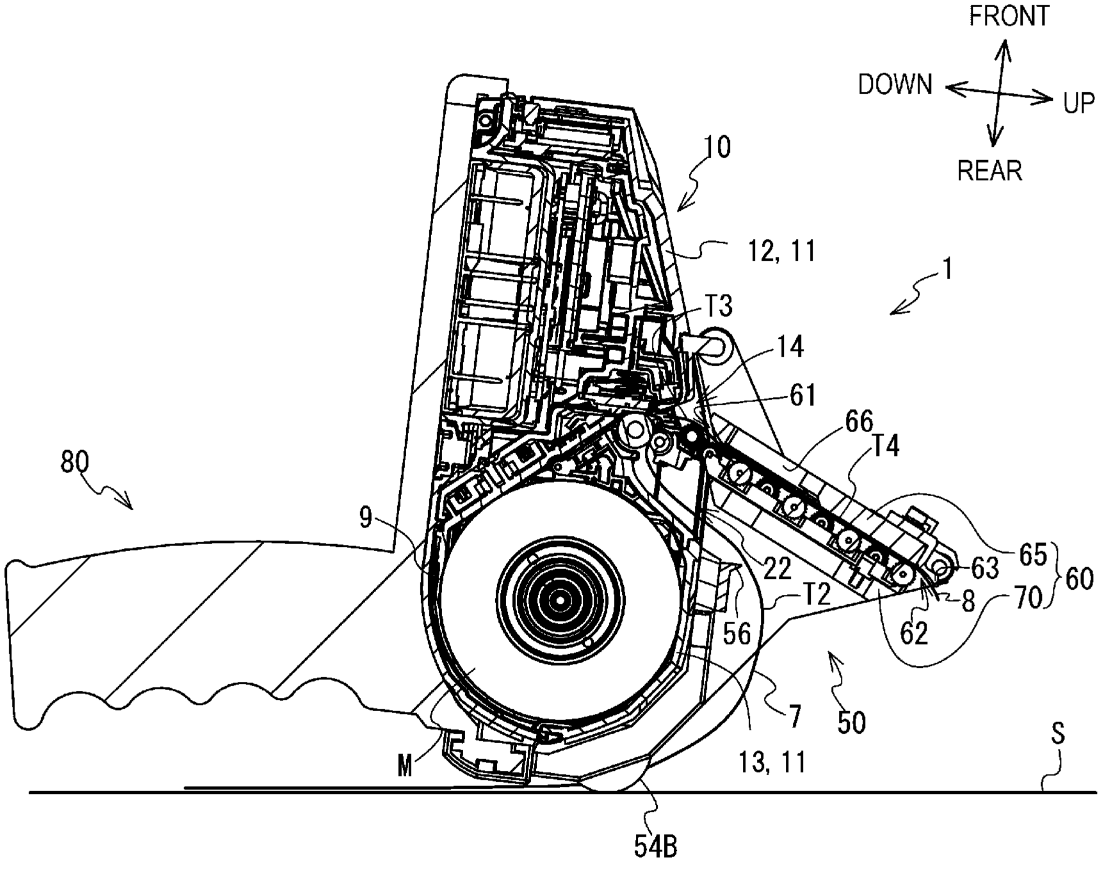

FIG. 10 is a cross-sectional view of the labeling apparatus 1 in which a contact portion 54B is in contact with a sticking target surface S.

Figure 11A:
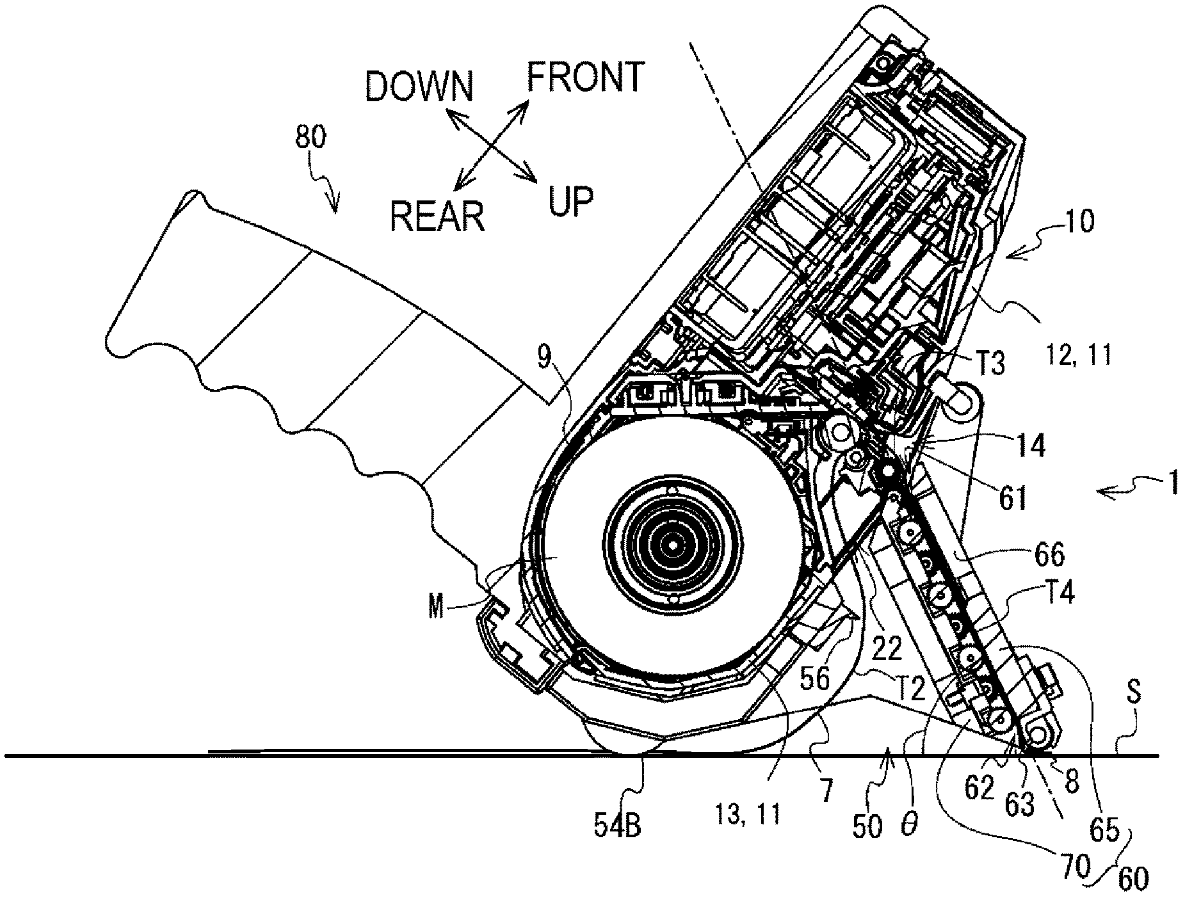
Figure 11B:
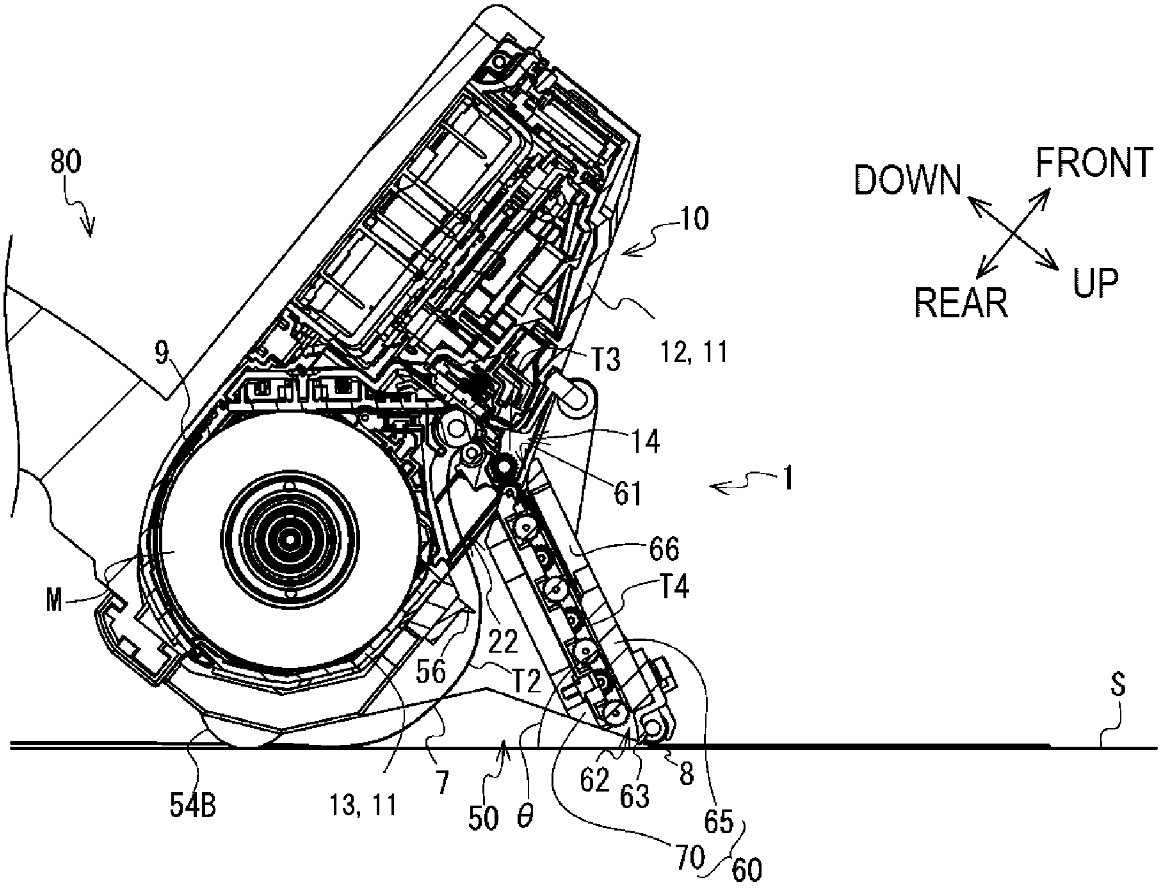

FIGS. 11A and 11B are cross-sectional views of the labeling apparatus 1 in which a label 8 is stuck to the sticking target surface S.

Figure 12:
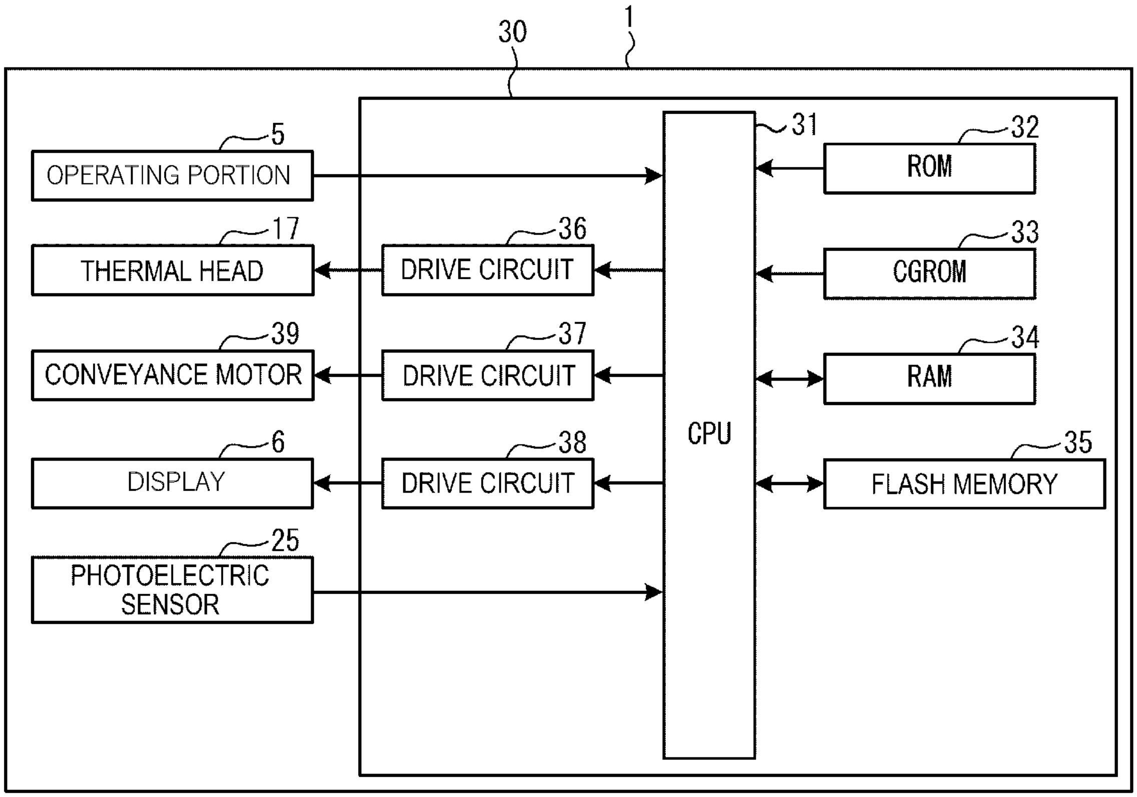

FIG. 12 is a schematic diagram showing an electrical configuration of the labeling apparatus 1.

Figure 13:
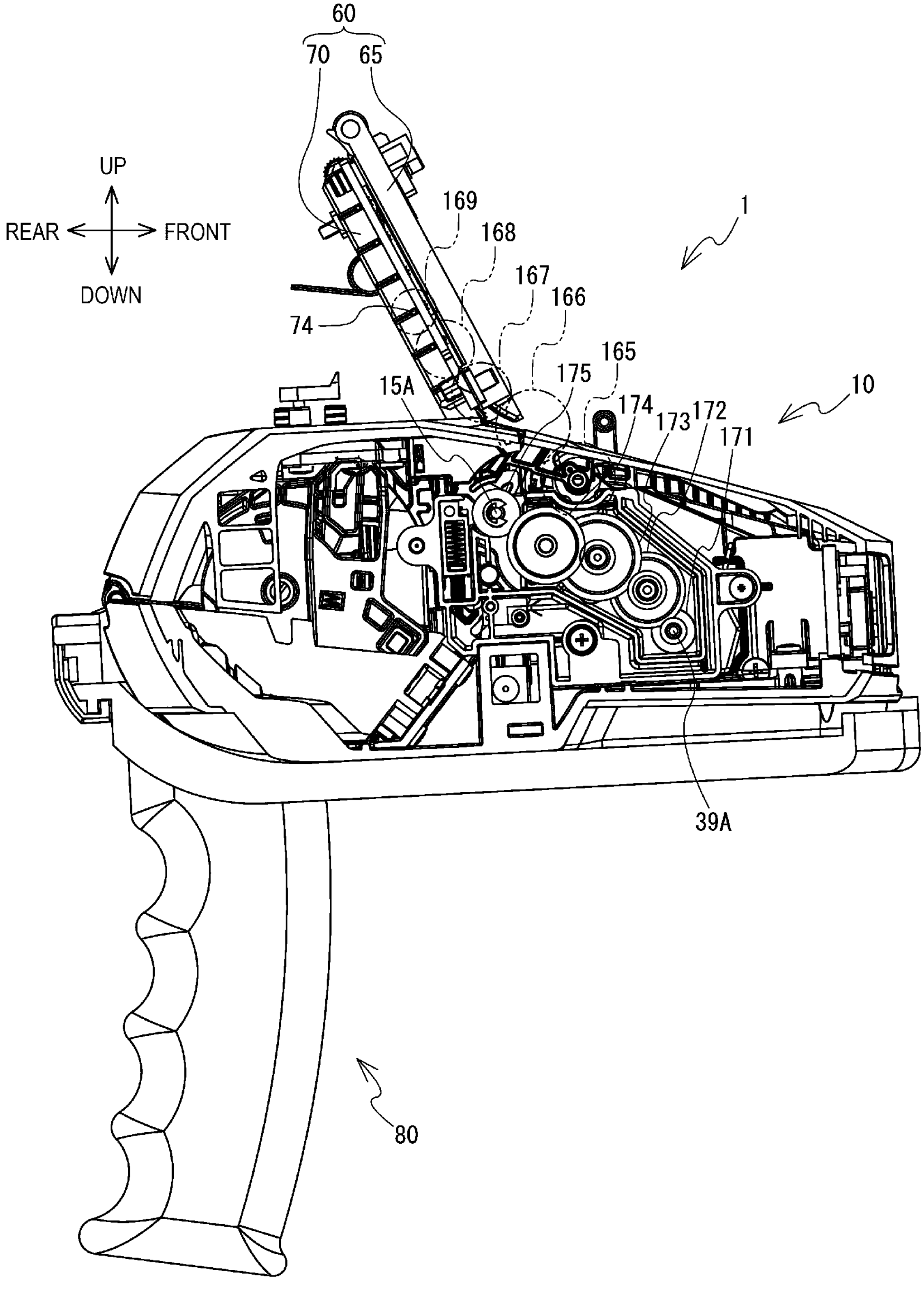

FIG. 13 is a cross-sectional view of a driver of the labeling apparatus 1 as viewed from the left side.

Figure 14:
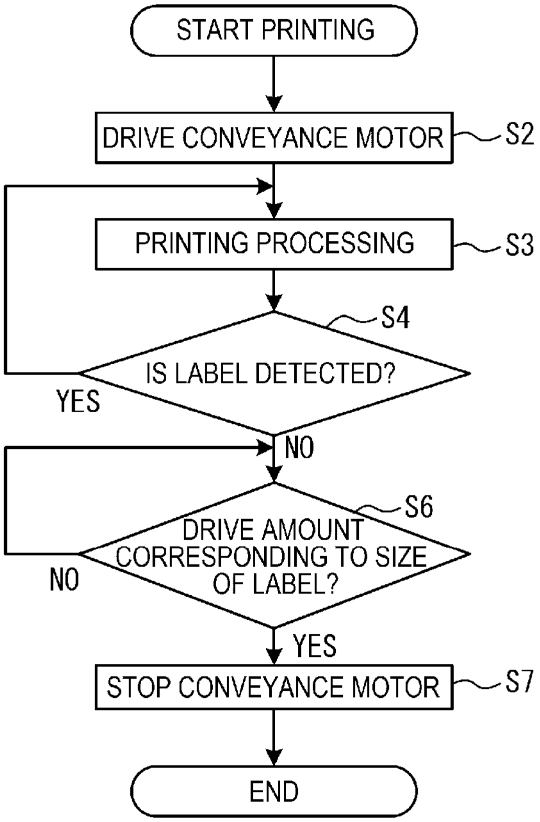

FIG. 14 is a flowchart of a process at the time of printing.

Figure 1:
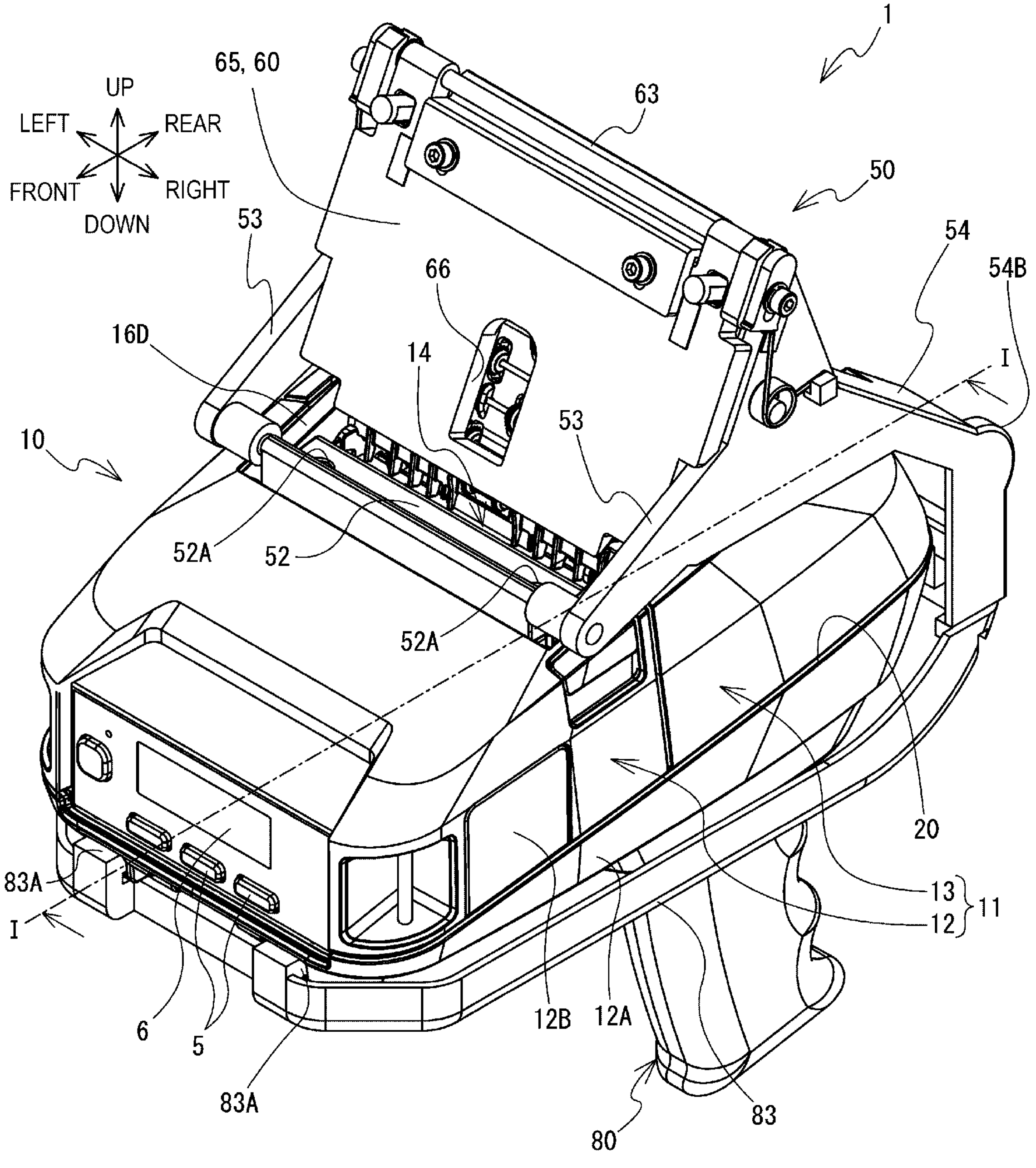
FIG. 1 is a front perspective view of a labeling apparatus 1.

A labeling apparatus 1 according to an embodiment of the present disclosure will be described with reference to the drawings. In the following description, a lower right side, an upper left side, an upper right side, a lower left side, an upper side, and a lower side in FIG. 1 are respectively defined as a right side, a left side, a rear side, a front side, an upper side, and a lower side of the labeling apparatus 1. The labeling apparatus 1 is an apparatus in which a discharge portion 50 and a gripping portion 80 are attached to a printing portion 10. The printing portion 10 is a printing device capable of printing on a label 8 stuck to a mount 7. The printing portion 10 can print characters such as letters and figures on the label 8. The discharge portion 50 is a portion that receives the label 8 that is printed and peeled from the mount 7 from the printing portion 10 and holds an edge portion on a downstream side in a conveyance direction in a state of being exposed from the discharge port 62. The gripping portion 80 is a portion having a handle for a user to hold the labeling apparatus 1 with one hand. As shown in FIG. 5, the discharge portion 50 is detachably attached to an upper surface side of the printing portion 10 with screws 51. The gripping portion 80 is detachably attached to a lower surface side of the printing portion 10 with screws 81.

Figure 2:
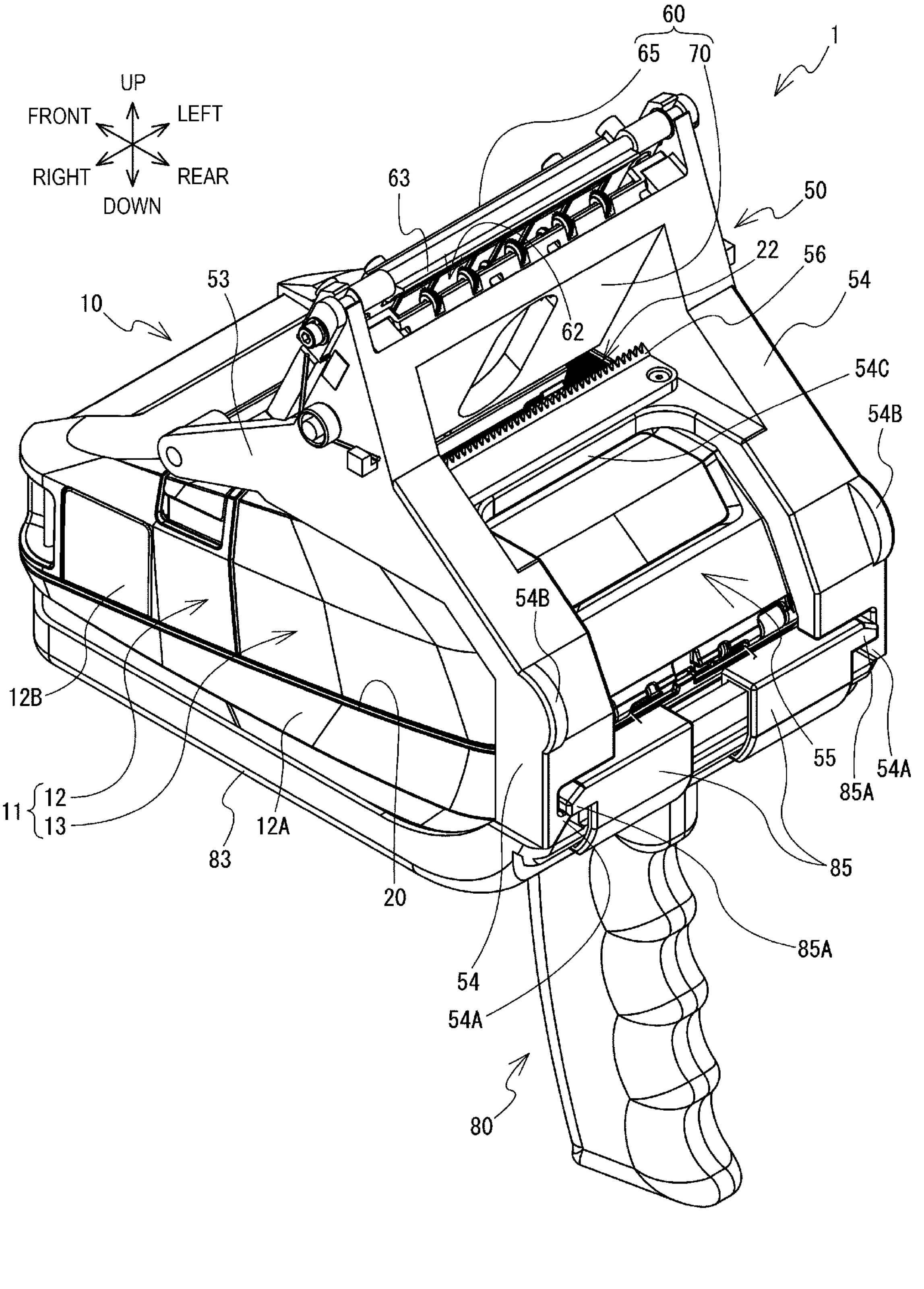
FIG. 2 is a rear perspective view of the labeling apparatus 1.

Next, the printing portion 10 of the labeling apparatus 1 will be described with reference to FIGS. 1 to 3. As shown in FIGS. 1 and 2, the printing portion 10 includes a box-shaped housing 11. The housing 11 is formed of a main body case 12 and a cover 13. The main body case 12 has a substantially rectangular parallelepiped box shape. The main body case 12 includes a bottom portion 12A and a front cover portion 12B. The bottom portion 12A covers an inner region of the printing portion 10 from the lower side. The front cover portion 12B covers a front side substantial half of the inner region of the printing portion 10 from the upper side. An operating portion 5 and a display 5 are provided on a front surface of the main body case 12. The operating portion 5 is used to input various instructions to the printing portion 10. The display 5 displays various kinds of information. As shown in FIG. 3, an attachment portion 24 is provided on a rear side substantial half portion of the bottom portion 12A. A roll M is attached to the attachment portion 24. The roll M has a roll shape in which a label sheet 9 is wound around a tubular core material. The label sheet 9 is a sheet in which a plurality of labels 8 are stuck to the elongated sheet-shaped mount 7. Holders (not shown) are attached to both ends of the core material. Since the holders are attached to the attachment portion 24, the roll M is rotatably supported within the attachment portion 24.

As shown in FIGS. 1 and 2, the main body case 12 includes an opening 20 formed by an upper end portion of the rear side substantial half of the bottom portion 12A and a rear end portion of the front cover portion 12B. An upper side of the attachment portion 24 (see FIG. 3) is opened by the opening 20. The opening 20 can be opened and closed by the cover 13. The cover 13 is rotatably supported by a rear end portion of the bottom portion 12A of the main body case 12. The cover 13 can swing around the rear end portion between a closed state and an open state. The cover 13 covers the attachment portion 24 from the upper side in the closed state and opens the attachment portion 24 in the open state. The cover 13 of FIG. 1 is in the closed state.

Figure 4:
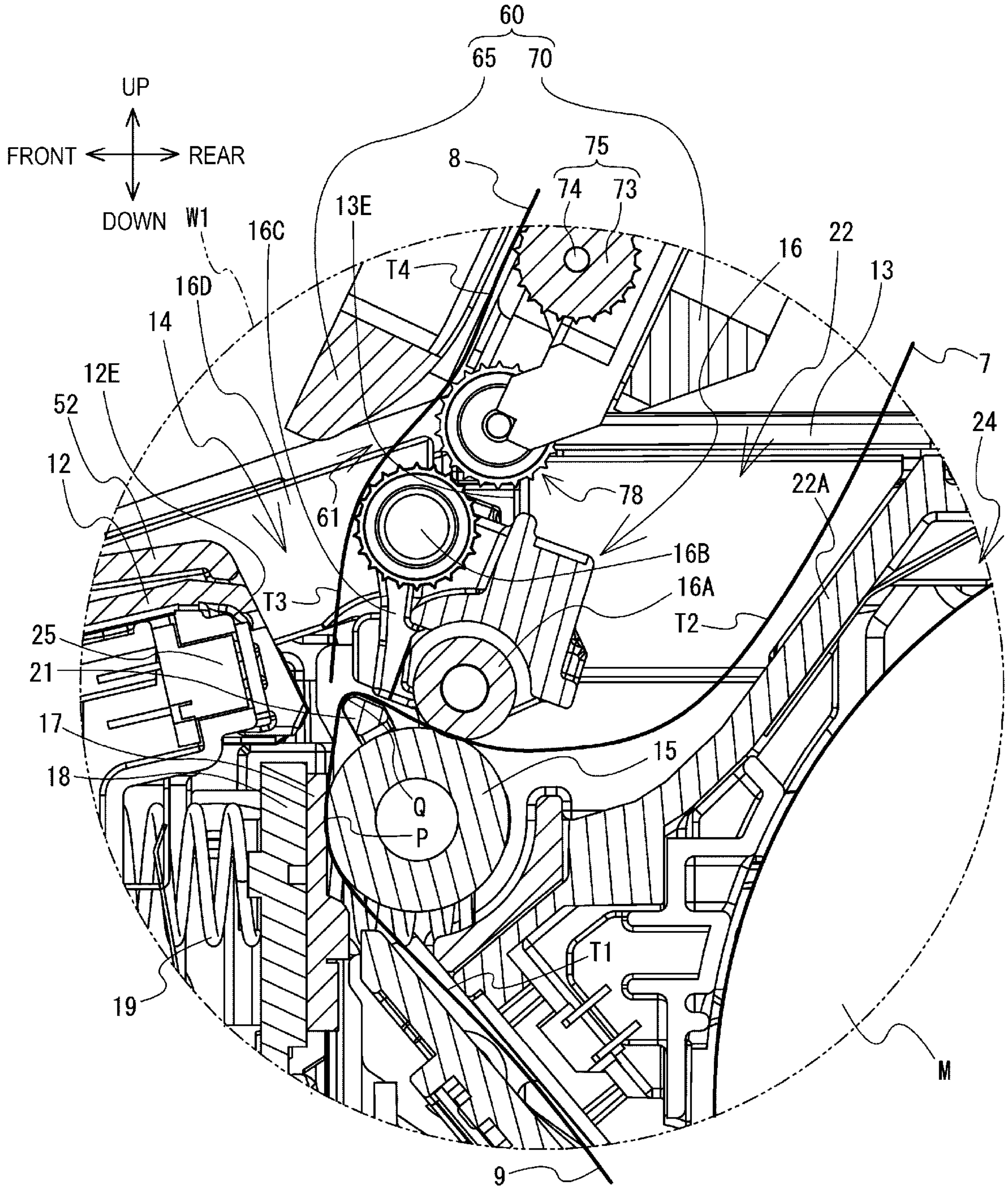
FIG. 4 is a cross-sectional view of the labeling apparatus 1 in which the inside of a two-dot chain line W1 in FIG. 3 is enlarged.

As shown in FIG. 4, a label discharge port 14 is formed a rear end portion 12E of the front cover portion 12B of the main body case 12 and a front end portion 13E of the cover 13. As shown in FIG. 1, the label discharge port 14 extends in a left-right direction. The label discharge port 14 discharges the label 8 printed by a thermal head 17 (see FIG. 3) inside the printing portion 10 to the outside of the housing 11. A mount discharge port 22 is formed behind the label discharge port 14. The mount discharge port 22 discharges the mount 7 from which the label 8 is peeled to the outside of the housing 11. The mount discharge port 22 is formed in a portion of an upper surface of the cover 13 where an intermediate portion in the left-right direction of the front end portion 13E is cut out rearward. A guide wall 22A for guiding the mount 7 to the mount discharge port 22 is provided behind the thermal head 17. The guide wall 22A partitions the mount discharge port 22 and the attachment portion 24 in the housing 11 (see FIG. 3).

A platen roller 15 is provided in the vicinity of the front end portion 13E of a lower surface of the cover 13. The platen roller 15 has a cylindrical shape and is rotatably supported about an axis extending in the left-right direction. A drive motor (not shown) is connected to the platen roller 15 via a plurality of gears (not shown).

The thermal head 17 is provided in front of the platen roller 15 when the cover 13 is closed. The thermal head 17 includes a plurality of heating elements (not shown) and prints characters on the label 8 by heating the label 8. The thermal head 17 extends in the left-right direction. A heatsink 18 is disposed on the front side of the thermal head 17. The heatsink 18 dissipates heat from the thermal head 17. A rear end portion of a spring 19 is connected to the front side of the heatsink 18. A front end portion of the spring 19 is held within the front cover portion 12B of the main body case 12. The heatsink 18 and the thermal head 17 are biased to the rear side by an elastic force of the spring 19. When the cover 13 is closed, the platen roller 15 is brought into contact with the thermal head 17 from the rear side. A position at which the platen roller 15 and the thermal head 17 are in contact with each other is referred to as a "printing position P". The thermal head 17 forms an image on the label 8 at the printing position P by generating heat while the label sheet 9 is sandwiched between the thermal head 17 and the platen roller 15.

As shown in FIGS. 3 and 4, the label sheet 9 is fed out from the vicinity of a lower end portion of the roll M in a state of being accommodated in the attachment portion 24 of the housing 11. A conveyance path T1 of the label sheet 9 fed out from the roll M extends obliquely upward and forward and from the vicinity of the lower end portion of the roll M. The conveyance path T1 is further bent upward at the vicinity of the rear side of the thermal head 17 and extends upward through the printing position P. The platen roller 15 is in contact with the conveyance path T1 at the printing position P. Further, the conveyance path T1 is slightly bent rearward and extends obliquely upward and rearward toward the label discharge port 14. When the label sheet 9 is conveyed along the conveyance path T1, the label 8 is disposed on the front side of the mount 7. A surface of the label 8 to which an adhesive adheres is referred to as an "adhesive surface". The adhesive surface of the label 8 is disposed on a back surface side in the conveyance path T1.

A peeler 21 is provided obliquely upward and forward of the platen roller 15 when the cover 13 is closed. The peeler 21 has a rod shape extending in the left-right direction, has a curved surface bent at an acute angle toward a leading end side facing obliquely upward and forward, and is disposed parallel to the platen roller 15. The conveyance path T1 is a path along which the label sheet 9 fed out from the roll M passes through the printing position P and moves upward until the label sheet 9 comes into contact with a leading end portion of the peeler 21 that peels the label 8 from the mount 7. The mount 7, on which the label 8 is peeled by the peeler 21, is folded obliquely downward and rearward and heads toward a conveyance path T2. The conveyance path T2 is a path along which the mount 7, on which the label 8 is peeled by the peeler 21, heads toward the mount discharge port 22. The label 8 is fed to an upper conveyance path T3. The conveyance path T3 is a path along which the label 8 peeled by the peeler 21 heads toward the label discharge port 14. A position at which the peeler 21 is brought into contact with the conveyance path T1 of the label sheet 9 is referred to as a "peeling position Q". The label 8 is peeled from the mount 7 at the peeling position Q.

A label guide member 16 is disposed above the platen roller 15. The label guide member 16 is provided in the discharge portion 50, which will be described later. The label guide member 16 includes a peeling roller 16A, a guide roller 16B, a guide rib 16C, and a guide arm 16D. The peeling roller 16A is disposed above the platen roller 15 and behind the peeler 21 when the cover 13 is closed. The peeling roller 16A has a cylindrical shape rotatable about an axis extending in the left-right direction. The peeling roller 16A sandwiches the mount 7, from which the label 8 is peeled by the peeler 21, between the peeling roller 16A and the platen roller 15 and conveys the mount 7 along the conveyance path T2 toward the mount discharge port 22. Both ends of the peeling roller 16A are supported by the guide arm 16D. A pair of guide arms 16D are provided, extend forward, and are swingably supported by a base portion 52 of the discharge portion 50, which will be described later.

The guide rib 16C is disposed in front of the peeling roller 16A and above the platen roller 15 when the cover 13 is closed. A plurality of guide ribs 16C are disposed in the left-right direction and have a rib shape extending in an up-down direction. Both ends of the guide rib 16C in the left-right direction are fixed to the guide arm 16D. The guide roller 16B is disposed at an upper end portion of the guide rib 16C and near a central portion of the guide rib 16C in the left-right direction. The guide roller 16B is a two-wheel spur in which blade edges protruding in a needle shape are radially formed along an outer periphery, and rotates in the left-right direction in an axial direction. The guide rib 16C and the guide roller 16B guide the label 8 along the conveyance path T3 to the label discharge port 14 while preventing the adhesive surface of the label 8 after being peeled by the peeler 21 from being rounded inward due to curling tendency of the roll M. The conveyance path T3 is substantially in the same direction as a path through which the label sheet 9 passes immediately before the label 8 is peeled by the peeler 21 in the conveyance path T1 of the label sheet 9. The label guide member 16, together with the platen roller 15, partitions the label discharge port 14 and the mount discharge port 22 in the housing 11.

A reflection-type photoelectric sensor 25 is provided obliquely upward and forward of the platen roller 15. The photoelectric sensor 25 emits light from a light projecting portion toward the upper side of the peeler 21. When the label 8 is directly above the peeler 21, the photoelectric sensor 25 detects presence or absence of the label 8 by receiving the reflected light from the label 8 by a light receiving portion. A controller (not shown) of the printing portion 10 controls printing on the next label 8 in accordance with a detection result of the label 8 by the photoelectric sensor 25.

Next, the gripping portion 80 of the labeling apparatus 1 will be described. As shown in FIG. 5, the gripping portion 80 is a portion extending in the up-down direction and having a grip shape to be gripped by a user with one hand. The gripping portion 80 has recesses on the rear side for placing fingers of the user. When the user grips the gripping portion 80, a front surface side of the printing portion 10 is disposed on a front side of the user. The gripping portion 80 is connected to a mounting portion 83. The mounting portion 83 is a portion on which the gripping portion 80 is attached to the printing portion 10 and has a plate shape that covers a bottom surface of the printing portion 10. A front end portion of the mounting portion 83 is provided with two claw portions 83A that engage with two engagement holes 11A formed in a front lower portion of the housing 11 of the printing portion 10. The mounting portion 83 includes a pair of through holes 83B arranged in the left-right direction substantially at a center in a front-rear direction. The screw 81 is inserted through the through hole 83B and fastened to the bottom surface of the printing portion 10 to fix the mounting portion 83 to the printing portion 10. The rear end portion of the mounting portion 83 is provided with lock portions 85. The lock portions 85 are formed in a pair and have a claw portion 85A at respective end portions thereof. The claw portion 85A is engaged with the claw portion 54A of the discharge portion 50, which will be described later, and holds the discharge portion 50 at a position (described later) close to the printing portion 10. Each of the pair of lock portions 85 is biased outward in the left-right direction, and an engagement state between the claw portion 85A and the claw portion 54A of the discharge portion 50 is maintained. The user moves the lock portions 85 toward the center, and thus the claw portions 85A releases the claw portions 54A of the discharge portion 50 from being held.

Next, the discharge portion 50 of the labeling apparatus 1 will be described. As shown in FIGS. 1 and 2, the discharge portion 50 includes a base portion 52, the label guide member 16, a support arm 53, a fixing arm 54, a main body portion 70, a cover portion 65, and a cutting portion 56. The base portion 52 is a portion on which the discharge portion 50 is attached to the printing portion 10 and has a plate shape extending in the left-right direction. The base portion 52 includes through holes 52A at two end portions in the left-right direction. The screw 51 (see FIG. 5) is inserted into the through hole 52A to be fastened to the upper surface of the printing portion 10 and fixes the base portion 52 to a front side of the label discharge port 14 of the printing portion 10. In the label guide member 16, front end portions of the pair of guide arms 16D are pivotally supported by both ends of the base portion 52. A biasing member (not shown) is provided between the guide arm 16D and the base portion 52. When the cover 13 is in the open state, the peeling roller 16A of the label guide member 16 moves above a contact position between the peeling roller 16A and the platen roller 15 by a biasing force. When the cover 13 is in the closed state, the peeling roller 16A is pressed by the front end portion 13E of the cover 13 to move downward and comes into contact with the platen roller 15.

A pair of support arms 53 are provided and extend in the front-rear direction. A front end portion of the support arm 53 is pivotally supported at a position obliquely upward and forward than a front end portion of the guide arm 16D at both ends of the base portion 52. A rear end portion of the support arm 53 is positioned obliquely upward and rearward. A pair of fixing arms 54 are provided and are connected to the support arm 53. The fixing arm 54 extends rearward in accordance with a shape of the cover 13, is bent obliquely downward, and further extends downward. The fixing arm 54 includes a claw portion 54A at a lower end portion. The claw portion 54A is engaged with the claw portion 85A of the lock portion 85 of the gripping portion 80, and thus the discharge portion 50 is held at a close position. The close position is a position of the discharge portion 50 at which the support arm 53 pivots and the main body portion 70 is closed to the label discharge port 14 of the printing portion 10. As shown in FIG. 6, a position of the discharge portion 50 at which the support arm 53 is pivoted and the main body portion 70 is separated from the label discharge port 14 is referred to as a separation position. When the discharge portion 50 is at the close position, the discharge portion 50 can take in and hold the label 8 printed by the printing portion 10 and discharged from the label discharge port 14.

As shown in FIGS. 1 and 2, the fixing arm 54 includes contact portions 54B above the claw portions 54A. The contact portion 54B has a semicircular plate shape and protrudes obliquely upward and rearward from a rear surface of each of the fixing arms 54. The contact portions 54B are formed at a right end portion of the fixing arm 54 at a right side and at a left end portion of the fixing arm 54 at a left side. Here, as shown in FIG. 3, a region in which a holder 60 (described later) including the discharge port 62 of the discharge portion 50 is formed with respect to the housing 11 is referred to as A1, and a region in which the gripping portion 80 is formed with respect to the housing 11 is referred to as A2. A region connecting the region A1 and the region A2 is referred to as A3. In this case, the contact portion 54B protrudes outward (rearward) of the housing 11 from the region A3. With this configuration, when the printed label 8 is stuck to a sticking target surface S (see FIG. 10), the user can cause only the contact portion 54B to come into contact with the sticking target surface S in a state in which the user grips the gripping portion 80. Since the contact portion 54B has a semicircular shape, the user can swing the labeling apparatus 1 while maintaining a state in which the contact portion 54B is in contact with the sticking target surface S.

As shown in FIGS. 1 and 2, the pair of fixing arms 54 are disposed apart from each other in the left-right direction by an amount corresponding to a length of the mount discharge port 22 in the left-right direction. That is, the mount 7 discharged from the mount discharge port 22 can pass between the fixing arms 54. The contact portion 54B protrudes from the fixing arm 54. Accordingly, even in a state where the contact portion 54B is in contact with the sticking target surface S, the labeling apparatus 1 can guide the mount 7 in a direction away from the mount discharge port 22 via a guide portion 55 (see FIG. 2) which is a gap through which the mount 7 can pass between the two contact portions 54B.

Abridge portion 54C has a plate shape extending in the left-right direction and bridges the pair of fixing arms 54 behind the mount discharge port 22. The mount discharge port 22 exposes between the bridge portion 54C and the main body portion 70. A cutting portion 56 is provided on an upper surface of the bridge portion 54C. The user can cut the mount 7 discharged from the mount discharge port 22 to the outside of the housing 11 by the cutting portion 56.

The holder 60 is provided at a connection portion between the support arm 53 and the fixing arm 54. The holder 60 is a portion that holds the label 8 discharged from the housing 11 before the label 8 is stuck to the sticking target surface S. The holder 60 includes the cover portion 65 and the main body portion 70. The main body portion 70 has a plate shape and extends obliquely upward and rearward from the connection portion between the support arm 53 and the fixing arm 54. A rear surface of the main body portion 70 is connected to the fixing arms 54 at two end portions in the left-right direction and is supported by the fixing arms 54 in a state in which a front surface is directed obliquely upward and forward. The cover portion 65 is disposed on a front surface side of the main body portion 70. The cover portion 65 has a plate shape that covers the front surface of the main body portion 70 and is pivotally supported by a shaft extending in the left-right direction in an upper portion of the main body portion 70. As shown in FIG. 7, the cover portion 65 is pivoted and opened, and the inside of the holder 60 can be exposed. As shown in FIGS. 3 and 4, a conveyance path T4 of the label 8 in the discharge portion 50 is provided in the holder 60. When the discharge portion 50 is at the close position, the label 8 discharged from the label discharge port 14 enters the holder 60 from an intake port 61, which is a gap between the main body portion 70 and the cover portion 65 at a lower end portion of the main body portion 70, and is conveyed along the conveyance path T4. A direction in which the label 8 is conveyed along the conveyance path T4 in the holder 60 is referred to as the conveyance direction. The conveyance direction in a case in which the discharge portion 50 is at the close position is a direction from an obliquely upward and forward side to an obliquely upward and rearward side. The cover portion 65 includes a window portion 66 for viewing the conveyance path T4 from the outside. Before sticking the printed label 8 to the sticking target surface S, the user can confirm that the label 8 is held in the conveyance path T4 via the window portion 66.

As shown in FIG. 7, the main body portion 70 includes a plurality of spur bodies 75. One spur body 75 includes a shaft body 74 extending in the left-right direction and a plurality of spurs 73. The plurality of spurs 73 are fixed to the shaft body 74. That is, all spurs 73 fixed to the shaft body 74 rotate as the shaft body 74 rotates. Since rotation amounts of the plurality of spurs 73 are aligned, the spur body 75 can convey the label 8 straight in the discharge direction. The plurality of spur bodies 75 are arranged side by side along the conveyance path T4 (see FIG. 4) in which the label 8 is conveyed in the holder 60. Each of the spur bodies 75 is supported by the holder 60 and is rotatable. The conveyance path T4 is a front surface side of each spur body 75. The label 8 conveyed along the conveyance path T4 is conveyed with the adhesive surface facing rearward, that is, a spur body 75 side. Therefore, the label 8 is conveyed with the adhesive surface in contact only with needle portions of the spur 73, and thus jamming in the holder 60 is less likely to occur. In one spur body 75, all of the plurality of spur 73 arranged in the left-right direction, that is, in a width direction orthogonal to the conveyance direction of the label 8 along the conveyance path T4, rotate at the same time.

Therefore, when being conveyed along the conveyance path T4, the label 8 is less likely to be inclined with respect to the conveyance direction.

As shown in FIGS. 4 and 7, the holder 60 includes spur bodies 78 in the intake port 61. The spur body 78 has the same configuration as the spur body 75 and is disposed at an opening end on the rear side of the intake port 61. The label 8 peeled from the mount 7 receives a force applied to the mount 7 conveyed to the rear of the peeler 21 and pulled rearward. The leading end portion (end portion on the downstream side) of the label 8 has the curling tendency when the label 8 is wound as the roll M, and comes close to, after the peeling, an opening end on the rear side of the intake port 61 by receiving the force pulled toward an adhesive surface side. The spur body 78 captures the leading end portion of the label 8 approaching the opening end with the spur 73 and guides the leading end portion to the conveyance path T4, thereby preventing the leading end portion of the label 8 from being not capable of entering the conveyance path T4 from the intake port 61.

Next, as shown in FIGS. 3 and 8, the label 8 conveyed along the conveyance path T4 is discharged from the discharge port 62 to the outside of the holder 60. The discharge port 62 is a gap between the cover portion 65 and the main body portion 70 at an upper end portion of the main body portion 70. The discharge port 62 is provided with a spatula plate 63. The spatula plate 63 has a plate shape extending in the left-right direction and is fixed to an upper end portion of the cover portion 65. A leading end portion of the spatula plate 63 protrudes toward the outside of the discharge port 62. At the time of sticking the label 8, the spatula plate 63 presses the label 8 against the sticking target surface S, thereby preventing the label 8 from floating.

Operations at the time of exchanging the roll M will be described. As shown in FIG. 6, the user slides the lock portions 85 of the gripping portion 80 and releases the engagement between the claw portion 85A and the claw portion 54A of the discharge portion 50. The user pivots the discharge portion 50 from the close position to the separation position. As shown in FIG. 9, the user opens the cover 13 to pivot the cover 13 from the closed state to the open state and exposes the attachment portion 24. The platen roller 15 is provided at the front end portion 13E of the cover 13, and moves upward away from the thermal head 17 as the cover 13 is opened. The peeling roller 16A of the label guide member 16 moves upward away from the contact position between the peeling roller 16A and the platen roller 15 by the biasing force as the cover 13 is opened. Therefore, the label discharge port 14 and the mount discharge port 22 are not partitioned by the platen roller 15 and the label guide member 16 inside the housing 11.

The user exchanges the roll M and attaches the roll M on the attachment portion 24. The user places the label sheet 9 pulled out from the roll M along the conveyance path T1 and closes the cover 13. The user peels a part of the label 8 from the mount 7 at the end portion on the downstream side of the label sheet 9 and sandwiches the mount 7 between the peeling roller 16A and the platen roller 15. The label 8 is placed at a label discharge port 14 side. The user moves the discharge portion 50 from the separation position to the close position and engages the claw portion 54A to the claw portion 85A of the gripping portion 80. The exchanging of the roll M and setting of the label sheet 9 are completed.

Next, an electrical configuration of the labeling apparatus 1 will be described with reference to FIG. 12. The printing portion 10 of the labeling apparatus 1 includes an electronic circuit board 30 for control. The electronic circuit board 30 includes a CPU 31, a ROM 32, a CGROM 33, a RAM 34, a flash memory 35, and drive circuits 36 to 38.

The CPU 31 centrally controls the labeling apparatus 1. The ROM 32 stores various programs and various parameters required when the CPU 31 executes the various programs. The CGROM 33 stores printing dot pattern data for printing characters. The RAM 34 includes a plurality of storage regions such as a text memory and a print buffer. The flash memory 35 stores various parameters and the like for the CPU 31 to control the labeling apparatus 1. The flash memory 35 stores various data to be saved even when a power of the labeling apparatus 1 is turned off. The drive circuit 36 is an electronic circuit for driving the thermal head 17 and drives the thermal head 17 according to instructions from the CPU 31. The drive circuit 37 is an electronic circuit for driving a conveyance motor 39 and drives the conveyance motor 39 according to the instructions from the CPU 31. The conveyance motor 39 rotates and drives the platen roller 15. The drive circuit 38 is an electronic circuit for driving the display 5 and drives the display 5 according to the instructions from the CPU 31.

The CPU 31 is connected to the operating portion 5 and the photoelectric sensor 25. The operating portion 5 receives an input of an operation on the operating portion 5 by the user and transmits the input to the CPU 31. The photoelectric sensor 25 inputs a detection result of presence or absence of a measurement target object (the printed label 8) to the CPU 31.

Next, operations at the time of printing will be described with reference to FIGS. 3, 4, and 8. The user operates the operating portion 5 provided on the front surface of the printing portion 10 to instruct printing on the label 8. A size of the label 8 that can be printed in the present embodiment is defined in advance. Therefore, the label sheet 9 is a sheet in which the labels 8 having the defined size are continuously stuck to the mount 7. In addition, print data indicating print content for the label 8 is stored in the flash memory 35 of the printing portion 10 in advance. The CPU 31 of the printing portion 10 drives the peeling roller 15 to convey the mount 7, which is sandwiched between the platen roller 15 and the peeling roller 16A, toward the mount discharge port 22. The label sheet 9 is pulled out from the roll M by conveying the mount 7. The CPU 31 drives the thermal head 17, and executes printing based on the print data read from the flash memory 35 on the label 8. When the label sheet 9 is pulled out from the conveyance path T1 as the mount 7 is conveyed, the label 8 is peeled from the mount 7 by the peeler 21 and is fed toward the label discharge port 14 along the conveyance path T3.

When being discharged from the label discharge port 14 to the outside of the housing 11, the label 8 enters the holder 60 of the discharge portion 50 from the intake port 61. Adhesion of the adhesive surface of the label 8 is prevented by contact between the adhesive surface of the label 8 and the needle-shaped blade edges of the spur 73. The label 8 is peeled by the peeler 21 by the pulling force of the platen roller 15 and the peeling roller 16A pulling the mount 7 and is conveyed along the conveyance path T3 toward the label discharge port 14. The label 8 has the defined size, and the CPU 31 controls a drive amount of the platen roller 15 so that a distance by which the platen roller 15 conveys the mount 7 at the time of printing coincides with a length of the label 8 in the conveyance direction. The CPU 31 executes the printing on the label 8 based on the print data in accordance with the conveyance of the label 8. When the driving of the platen roller 15 is stopped, the end portion on the downstream side in the conveyance direction is discharged by a predetermined length from the discharge port 62 of the holder 60. The label 8 is peeled from the mount 7, and is held by the holder 60 along the conveyance path T4 in a state in which the adhesive surface is supported by the spur bodies 75. When being completely peeled from the mount 7, the label 8 cannot move in the conveyance direction. Therefore, the lengths of the conveyance path T2 and the conveyance path T4 are designed to be slightly shorter than the length of the label 8 in the conveyance direction. As a result, the label 8 is completely peeled from the mount 7 when the end portion on the downstream side in the conveyance direction is discharged by a predetermined length from the discharge port 62. While the label 8 is held by the holder 60, the photoelectric sensor 25 is in a state where the end portion on the upstream side of the label 8 in the conveyance direction is detected. The user may cut the mount 7 discharged from the mount discharge port 22 with the cutting portion 56 or may leave the mount 7 without cutting.

Next, operations at the time of sticking will be described. As shown in FIG. 10, the user grips the gripping portion 80, faces the back surface side of the labeling apparatus 1 toward the sticking target surface S of the label 8, and brings only the sticking target surface S into contact with the contact portion 54B. As described above, the contact portion 54B protrudes outward from the housing 11 beyond the region A3 connecting the region A1 in which the holder 60 is formed and the region A2 in which the gripping portion 80 is formed (see FIG. 3). Therefore, the gripping portion 80 and the holder 60 are in a state separated from the sticking target surface S. The user can move the position of the label 8 exposed from the discharge port 62 of the holder 60 relative to the gripping portion 80 by moving the gripping portion 80 with respect to the sticking target surface S. When the mount 7 is not cut by the cutting portion 56, the user can dispose the mount 7 on a gripping portion 80 side via the guide portion 55 (see FIG. 3) and avoid contact between the mount 7 and the contact portion 54B. The user can confirm whether the printed label 8 is held by the holder 60 via the window portion 66 of the cover portion 65.

As shown in FIG. 11A, the user lifts the gripping portion 80 while keeping the contact portion 54B in contact with the sticking target surface S and brings the discharge port 62 of the holder 60 closer to the sticking target surface S. After positioning the end portion on the downstream side of the label 8 in the conveyance direction at a sticking position on the sticking target surface S, the user further lifts the gripping portion 80 and sticks the end portion on the downstream side of the label 8 in the conveyance direction to the sticking target surface S. The label 8 is pressed by the spatula plate 63 and does not float from the sticking target surface S.

As shown in FIG. 11B, the user pulls the labeling apparatus 1 toward the gripping portion 80 side with respect to the holder 60 while maintaining at least the state of pressing the spatula plate 63 against the sticking target surface S through the label 8. The label 8 is pulled out from the holder 60 and stuck to the sticking target surface S while being pressed by the spatula plate 63. The plurality of spurs 73 of the spur body 75 are fixed to the same shaft body 74 and rotate at the same time, and thus the label 8 is pulled out without being inclined and is directly stuck to the sticking target surface S. The photoelectric sensor 25 is in a state where the label 8 is not detected. When the user operates the operating portion 5, the printing portion 10 prints the next label 8 and causes the holder 60 to hold the printed label 8.

As described above, the holder 60 can hold the label 8 before being stuck to the sticking target surface S in a state of being peeled from the mount 7 before the label 8 is discharged from the discharge port 62. After positioning and sticking the end portion on the downstream side of the label 8 in the discharge direction to the sticking target surface S, the user can easily discharge the label 8 from the discharge portion 50 and stick the label 8 to the sticking target surface S simply by moving the housing 11. Since the force applied when the label 8 is peeled from the mount 7 does not act on the label 8 in the sticking of the label 8, the user can accurately stick the label 8 to the sticking target surface S.

By causing the end portion on the downstream side of the label 8 in the discharge direction to protrude from the discharge port 62, the user can easily position the end portion of the label 8 on the sticking target surface S while viewing the position of the end portion of the label 8, and thus the user can accurately stick the label 8 on the sticking target surface S.

The spur body 75 is in contact with the adhesive layer of the label 8, supports the label 8 in the holder 60, and can feed the label 8 in the discharge direction by rotation. The spur body 75 is only in contact with the adhesive layer, and it is difficult to apply a load to movement of the label 8 by feeding the label 8 in the discharge direction while rotating. Therefore, the user can accurately stick the label 8 to the sticking target surface S.

Since the plurality of spur bodies 75 are disposed side by side along the discharge direction, the label 8 is less likely to be conveyed while being inclined at the time of sticking. Therefore, the user can accurately stick the label 8 to the sticking target surface S.

Since the spur body 75 holds the plurality of spurs 73 in the same shaft body 74, the label 8 is less likely to be conveyed while being inclined at the time of sticking. Therefore, the user can accurately stick the label 8 to the sticking target surface S.

Since the spur 73 is fixed to the shaft body 74 and does not idle, the spur body 75 can prevent the label 8 from being wound around the spur body 75. Further, since rotation amounts of the plurality of spurs 73 are aligned, the spur body 75 can convey the label 8 straight in the discharge direction, and it is possible to more reliably prevent the label 8 from being obliquely inclined at the time of sticking.

The user can stick the label 8 to the sticking target surface S while confirming the size and an orientation of the label 8 by visually observing the label 8 held by the holder 60 through the window portion 66. Therefore, the user can accurately stick the label 8 to the sticking target surface S.

When jamming occurs in the holder 60, the user can easily perform jam processing by detaching the cover portion 65 from the main body portion 70. In addition, the user can easily perform maintenance of the spur body 75. Therefore, the user can maintain a state in which the holder 60 is normally operated, and thus the user can accurately stick the label 8 to the sticking target surface S at the time of sticking.

The spur body 75 is not driven, and the label 8 is conveyed by pulling the mount 7 with the platen roller 15 and the peeling roller 16A. Therefore, the labeling apparatus 1 does not require power for conveying the label 8 peeled from the mount 7 to the discharge portion 50, and can reduce the number of components and the production cost.

When being peeled from the label sheet 9, the label 8 is pushed out in the peeling direction of the label sheet 9. In the discharge portion 50, the label 8 is conveyed in the discharge direction, which is the same as the peeling direction, and is held by the holder 60. That is, the label 8 is conveyed in the same direction from peeling to holding. Therefore, a load is less likely to be applied to the label 8 during the conveyance of the label 8, and oblique feeding and the like during the conveyance can be prevented.

The labeling apparatus 1 cuts the peeled mount 7 by the cutting portion 56. The cutting portion 56 can be disposed at a position closer to the platen roller 15, the peeling roller 16A, and the peeler 21 by providing the cutting portion 56 in the discharge portion 50, and thus the sticking of the label 8 can be prevented from being hindered by an uncut mount 7.

The discharge portion 50 is attachable and detachable to the housing 11. Therefore, the user can easily perform maintenance of the housing 11 and the discharge portion 50 by removing the discharge portion 50.

The gripping portion 80 is attachable and detachable to the housing 11. Therefore, the user can easily perform maintenance of the housing 11 and the gripping portion 80 by removing the gripping portion 80.

In the embodiment described above, the platen roller 15, the peeling roller 16A and the peeler 21 correspond to the "peeling portion" of the present disclosure. The spur body 75 corresponds to the "rotation body" of the present disclosure. The conveyance path T4 corresponds to the "conveyance path" of the present disclosure. The peeler 21 corresponds to the "peeling body" of the present disclosure. The platen roller 15 and the peeling roller 16A correspond to the "pulling portion" of the present disclosure. The conveyance path T2 corresponds to the "guide path" of the present disclosure. The conveyance motor 39 corresponds to the "driver" of the present disclosure. The photoelectric sensor 25 corresponds to the "detector" of the present disclosure.

The present disclosure is not limited to the above-described embodiment, and various modifications may be made without departing from the scope of the present disclosure. The discharge portion 50 and the gripping portion 80 are optional parts to be attached on the housing 11 of the printing portion 10, so that the discharge portion 50 and the gripping portion 80 can be attached to and detached from the housing 11, and the base portion 52 and the gripping portion 80 may be provided directly on the housing 11 instead of being attached to or detached from the housing 11, and the number of components may be reduced. The holder 60 may be provided on the front end portion 13E of the cover 13 or may be provided on the label guide member 16.

In the housing 11, the label 8 is directed toward the label discharge port 14 along the conveyance path T2, and the conveyance direction thereof is the same as the conveyance direction in a portion of the conveyance path T1 in which the label sheet 9 is directed from the printing position P to the peeling position Q and may be different from the conveyance direction.

The lengths of the conveyance path T2 and the conveyance path T4 are designed to be slightly shorter than the length of the label 8 in the conveyance direction, and may be designed to be even shorter. In this case, the controller stops driving the platen roller 15 when the end portion on the downstream side of the label 8 in the conveyance direction is discharged from the discharge port 62 by a predetermined length. The end portion on the upstream side of the label 8 in the conveyance direction is stuck to the mount 7. The conveyance direction of the label 8 along the conveyance path T4 of the holder 60 is close to the conveyance direction in the portion of the conveyance path T1 in which the label sheet 9 is directed from the printing position P to the peeling position Q, and thus the label sheet 9 can be pulled by a pulling force of the label 8 at the time of sticking, and the label 8 can be peeled from the mount 7. In this case, it is preferable to set an orientation in which the holder 60 is arranged or a position relation between the peeling position Q with respect to the printing position P such that the conveyance direction of the label 8 in the holder 60 coincides with the direction from the printing position P toward the peeling position Q.

Since the cover portion 65 of the discharge portion 50 includes the window portion 66, it is possible to confirm the state in which the discharge portion 50 holds the label 8. However, the present disclosure is not limited thereto, and the cover portion 65 may be formed of, for example, a transparent or translucent material, so that the cover portion 65 functions as an observation window of the label 8 held in the conveyance path T4 and the label 8 can be confirmed. The contact portion 54B is provided on the fixing arm 54 of the discharge portion 50, and may be provided at the rear end portion of the main body case 12 or the rear end portion of the cover 13 of the housing 11, or may be provided at the rear end portion of the gripping portion 80.

The shaft body 74 of the spur body 75 may include a clutch mechanism that prevents reverse rotation. Accordingly, while the label 8 is being held in the holder 60, it is possible to prevent the end portion on the downstream side of the label 8 in the conveyance direction protruding from the discharge port 62 due to the curling tendency of the label 8 from being retracted into the discharge port 62. Instead of the spur body 75, a roller made of a material that is hard to adhere to the adhesive surface of the label 8 may be used.

Further, a driving force may be transmitted to the spur body 75 of the holder 60, and the label 8 may be conveyed by the rotation and driving of the spur 73. For example, as shown in FIG. 13, a drive shaft 39A of the conveyance motor 39 (see FIG. 12) is provided with a gear 171, and gears 172, 173, 174, and 175 are sequentially meshed with one another. The gear 175 is connected to a rotation shaft 15A of the platen roller 15. The gear 174 of a fourth stage is meshed with a gear 165 for distributing the driving force. Three gears 166, 167, and 168 sequentially mesh with the gear 165. The gear 168 is meshed with a gear 169 fixed to the shaft body 74 of the spur body 75 to be driven. These gears 166 to 169 are assembled to the inside of the left side fixing arm 54 of the discharge portion 50 and the inside of a left side surface of the holder 60. The driving force of the conveyance motor 39 is transmitted to the spur body 75 to be driven, which can pivot together with the platen roller 15. The plurality of spurs 73 of the spur body 75 are fixed to the shaft body 74, and the label 8 can be conveyed in the holder 60 by the pivoting of the spur body 75.

The gear 175 and the gear 166 are one-way clutches and transmit the driving force of the conveyance motor 39 in the orientation in which the platen roller 15 and the spur body 75 are rotated in the direction in which the label 8 is conveyed, and the transmission of the driving force is released in the orientation in which the platen roller 15 and the spur body 75 are rotated in the opposite direction. That is, when the conveyance motor 39 is stopped, the platen roller 15 and the spur body 75 can rotate in the conveyance direction of the label 8, and cannot rotate in the opposite direction a holding torque of the conveyance motor 39.

According to this configuration, even a label whose length in the conveyance direction is smaller than the defined size can be conveyed to the discharge port 162 after printing and held in the holder 60. As shown in FIG. 14, the CPU31 starts the printing of the label 8 according to the operation of the operating portion 5 by the user. The CPU 31 drives the conveyance motor 39 (S2) and conveys the mount 7 sandwiched between the platen roller 15 and the peeling roller 16A along the conveyance path T4. Accordingly, the label sheet 9 is pulled and conveyed along the conveyance path T1. The CPU 31 executes printing processing and drives the thermal head 17 to execute printing on the label 8 of the label sheet 9. While the photoelectric sensor 25 detects the label 8, the label 8 is not peeled from the mount 7 (S4: YES), and the CPU 31 returns the process to S3 to continue the printing processing.

When the photoelectric sensor 25 does not detect the label 8 (S4: NO), the CPU31 continues to drive the conveyance motor 39 based on a drive amount of the conveyance motor 39 until the drive amount reaches a drive amount corresponding to the length of the label 8 in the conveyance direction (S6: NO). When determining that the drive amount of the conveyance motor 39 reaches the drive amount according to the length of the label 8 in the conveyance direction (S6: YES), the CPU 31 stops the driving of the conveyance motor 39 (S7) to end the process. Since the label 8 is conveyed along the conveyance path T4 by the spur body 75 even after the platen roller 15 is stopped, the label 8 is held in the holder 60 in a state in which the end portion on the downstream side in the conveyance direction is discharged from the discharge port 62 by a predetermined length. Since the spur body 75 cannot rotate in the direction opposite to the conveyance direction of the label 8 due to the holding torque of the conveyance motor 39, the spur body 75 maintains the label 8 in a holding state. At the time of sticking the label 8, the spur body 75 is in a state in which the transmission of the driving force of the conveyance motor 39 is released and can rotate in the conveyance direction of the label 8, and thus the label 8 can be discharged from the discharge port 62.

In a case where the length of the label 8 in the discharge direction is shorter than the length of the holder 60, the end portion on the downstream side of the label 8 in the discharge direction cannot be protruded from the discharge port 62 only by the pulling force when the label 8 is peeled from the label sheet 9. By detecting the position of the end portion on the upstream side of the label 8 in the peeling direction by the photoelectric sensor 25 and driving the spur body 75 of the holder 60 according to the detection result, even an end portion on the downstream side of a short label 8 in the discharge direction can be reliably protruded from the discharge port 62. Therefore, the labeling apparatus 1 can be used even for the labels 8 having different lengths in the discharge direction.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A labeling apparatus comprising:

a housing;

a printing portion provided in the housing and configured to print on a plurality of labels of a label sheet in which the plurality of labels are stuck on an elongated mount, the plurality of labels being provided with an adhesive layer;

a peeling portion provided in the housing and configured to peel each of the plurality of labels printed by the printing portion from the elongated mount;

a discharge portion provided in the housing and having an intake port configured to take in each of the plurality of labels discharged from the housing discharge port and a discharge port for discharging the label peeled by the peeling portion, the discharge port being arranged at an end portion that is away from the housing; and a gripping portion provided on a side of the housing different from the discharge portion and configured to allow a user to grip with one hand, wherein the discharge portion includes a holder configured to hold each of the plurality of labels peeled by the peeling portion before the label is discharged from the discharge port.

2. The labeling apparatus according to claim 1, wherein the holder is configured to hold the label peeled by the peeling portion in a state in which an end portion on a downstream side of the label in a discharge direction protrudes downstream of the discharge port, the discharge direction being a direction in which each of the plurality of labels is conveyed in the discharge portion.

3. The labeling apparatus according to claim 2, wherein the holder includes a rotation body that is configured to contact with an adhesive surface on which the adhesive layer of the plurality of labels is formed.

4. The labeling apparatus according to claim 3, wherein the holder includes a plurality of rotation bodies, each of which serving as the rotation body, and wherein the plurality of rotation bodies are arranged side by side along the discharge direction.

5. The labeling apparatus according to claim 3, wherein the rotation body is configured to hold a plurality of spurs in each of which tooth tips protruding in a needle shape are radially formed along an outer periphery of a shaft body extending in a width direction orthogonal to the discharge direction.

6. The labeling apparatus according to claim 5, wherein the spur is fixed to the shaft body.

7. The labeling apparatus according to claim 6, wherein the discharge portion includes:

a main body portion configured to hold the rotation body and arranged on a sticking target surface side with respect to a conveyance path of the plurality of labels along the discharge direction in a state where each of the plurality of labels is stuck, and a cover portion arranged on a side opposite to the sticking target surface and configured to cover the conveyance path by being assembled to the main body portion, and wherein the cover portion includes a window portion through which each of the plurality of labels held by the holder is visible.

8. The labeling apparatus according to claim 7, wherein the cover portion is detachably attached to the main body portion.

9. The labeling apparatus according to claim 8, wherein the peeling portion includes:

a peeling body configured to peel each of the plurality of labels from the mount, and a pulling portion arranged at a position downstream of the peeling body in the conveyance path and configured to pull the mount from which each of the plurality of labels is peeled off, and wherein the label peeled from the mount in the peeling body is fed to the discharge portion by a pulling force by which the pulling portion pulls the mount.

10. The labeling apparatus according to claim 9, wherein the discharge direction of the discharge portion is the same as a peeling direction which is a direction in which the label sheet is conveyed immediately before each of the plurality of labels is peeled from the mount in the peeling portion.

11. The labeling apparatus according to claim 10, wherein the discharge portion includes:

an intake port configured to take in each of the plurality of labels peeled by the peeling portion and guide each of the plurality of labels to the holder, a guide path configured to guide the mount peeled by the peeling portion to the outside of the housing, and a cutting portion provided in the guide path and configured to cut the mount.

12. The labeling apparatus according to claim 11 further comprising:

a driver configured to drive the rotation body of the holder; and a detector provided at a position downstream in the peeling direction with respect to the peeling body of the peeling portion and configured to detect an end portion on an upstream side of each of the plurality of labels which is peeled from the mount in the peeling direction.

13. The labeling apparatus according to claim 12, wherein the housing includes a housing discharge port disposed to face the intake port of the discharge portion and configured to discharge each of the plurality of labels peeled by the peeling portion from the housing, and wherein the discharge portion is detachably attached to the housing.

14. The labeling apparatus according to claim 13, wherein the gripping portion is detachably attached to the housing.

15. A discharge portion of a labeling apparatus, the labeling apparatus including a housing, a printing portion configured to print on a plurality of labels of a label sheet in which the plurality of labels are stuck on an elongated mount, the label being provided with an adhesive layer, a peeling portion configured to peel each of the plurality of labels printed by the printing portion from the mount, a housing discharge port configured to discharge each of the plurality of labels peeled by the peeling portion from the housing, and a gripping portion provided on a side different from the housing discharge port in the housing and configured to allow a user to grip with one hand, the discharge portion being provided on a side of the housing different from the gripping portion, the discharge portion comprising:

an intake port configured to take in each of the plurality of labels discharged from the housing discharge port;

a discharge port arranged at an end portion that is away from the housing and configured to discharge each of the plurality of labels taken in from the intake port; and a holder configured to hold the label before each of the plurality of labels is discharged from the discharge port, wherein the discharge portion is detachably attached to the housing of the labeling apparatus.

16. A gripping portion of a labeling apparatus, the labeling apparatus including a housing, a printing portion configured to print on a plurality of labels of a label sheet in which the plurality of labels are stuck on an elongated mount, each of the plurality of labels being provided with an adhesive layer, a peeling portion configured to peel each of the plurality of labels printed by the printing portion from the mount, and a discharge portion having an intake port configured to take in each of the plurality of labels discharged from the housing discharge port, and a discharge port configured to discharge each of the plurality of labels peeled by the peeling portion and arranged at an end portion that is away from the housing, the gripping portion being provided on a side of the housing different from the discharge portion and configured to allow a user to grip with one hand wherein the discharge portion includes a holder configured to hold each of the plurality of labels before each of the plurality of labels is discharged from the discharge port, and wherein the gripping portion is detachably attached to the housing.

* * * * *